United States Patent
Keilaf et al.

(10) Patent No.: US 12,449,547 B2
(45) Date of Patent: Oct. 21, 2025

(54) SYSTEMS AND METHODS FOR RETRIEVAL OF POINT CLOUD DATA FROM CACHE IN RESPONSE TO TRIGGERING EVENTS

(71) Applicant: INNOVIZ TECHNOLOGIES LTD., Rosh Ha'Ayin (IL)

(72) Inventors: Omer David Keilaf, Kfar Saba (IL); Nir Goren, Herut (IL)

(73) Assignee: INNOVIZ TECHNOLOGIES LTD., Rosh Ha'Ayin (IL)

( * ) Notice: Subject to any disclaimer, the term of this patent is extended or adjusted under 35 U.S.C. 154(b) by 453 days.

(21) Appl. No.: 18/162,264

(22) Filed: Jan. 31, 2023

(65) Prior Publication Data
US 2024/0255645 A1    Aug. 1, 2024

(51) Int. Cl.
*G01S 17/931* (2020.01)
*B60W 60/00* (2020.01)
*G01S 17/89* (2020.01)

(52) U.S. Cl.
CPC ......... *G01S 17/931* (2020.01); *B60W 60/001* (2020.02); *G01S 17/89* (2013.01); *B60W 60/007* (2020.02); *B60W 2420/408* (2024.01); *B60W 2556/45* (2020.02); *B60W 2756/00* (2020.02)

(58) Field of Classification Search
None
See application file for complete search history.

(56) References Cited

U.S. PATENT DOCUMENTS

| | | |
|---|---|---|
| 2018/0081037 A1 | 3/2018 | Medina et al. |
| 2018/0081038 A1 | 3/2018 | Medina et al. |
| 2018/0100928 A1 | 4/2018 | Keilaf et al. |
| 2018/0113216 A1 | 4/2018 | Kremer et al. |
| 2021/0407143 A1* | 12/2021 | Van der Auwera .... H04N 19/13 |
| 2022/0342047 A1* | 10/2022 | Moscovici ............ G01S 17/931 |

FOREIGN PATENT DOCUMENTS

WO    2023280147 A1    1/2023

OTHER PUBLICATIONS

Extended European Search Report issued in corresponding European Patent Application No. 24155145.6-1206, on Jun. 27, 2024.

* cited by examiner

*Primary Examiner* — Dov Popovici
(74) *Attorney, Agent, or Firm* — Meitar Patents Ltd.; Daniel Kligler

(57) ABSTRACT

A LIDAR system includes a light source projecting laser light toward a field of view, a sensor detecting reflections from objects, and a processor. The processor generates point-cloud representations of the environment, outputs navigational information to vehicle processors, and stores the point-cloud representations in a memory as a point-cloud archive. Upon detecting a point-cloud archive output triggering event, the processor collects two or more point-clouds from the archive that were generated within a predetermined period of time relative to the detected event, and outputs them from the memory.

34 Claims, 14 Drawing Sheets

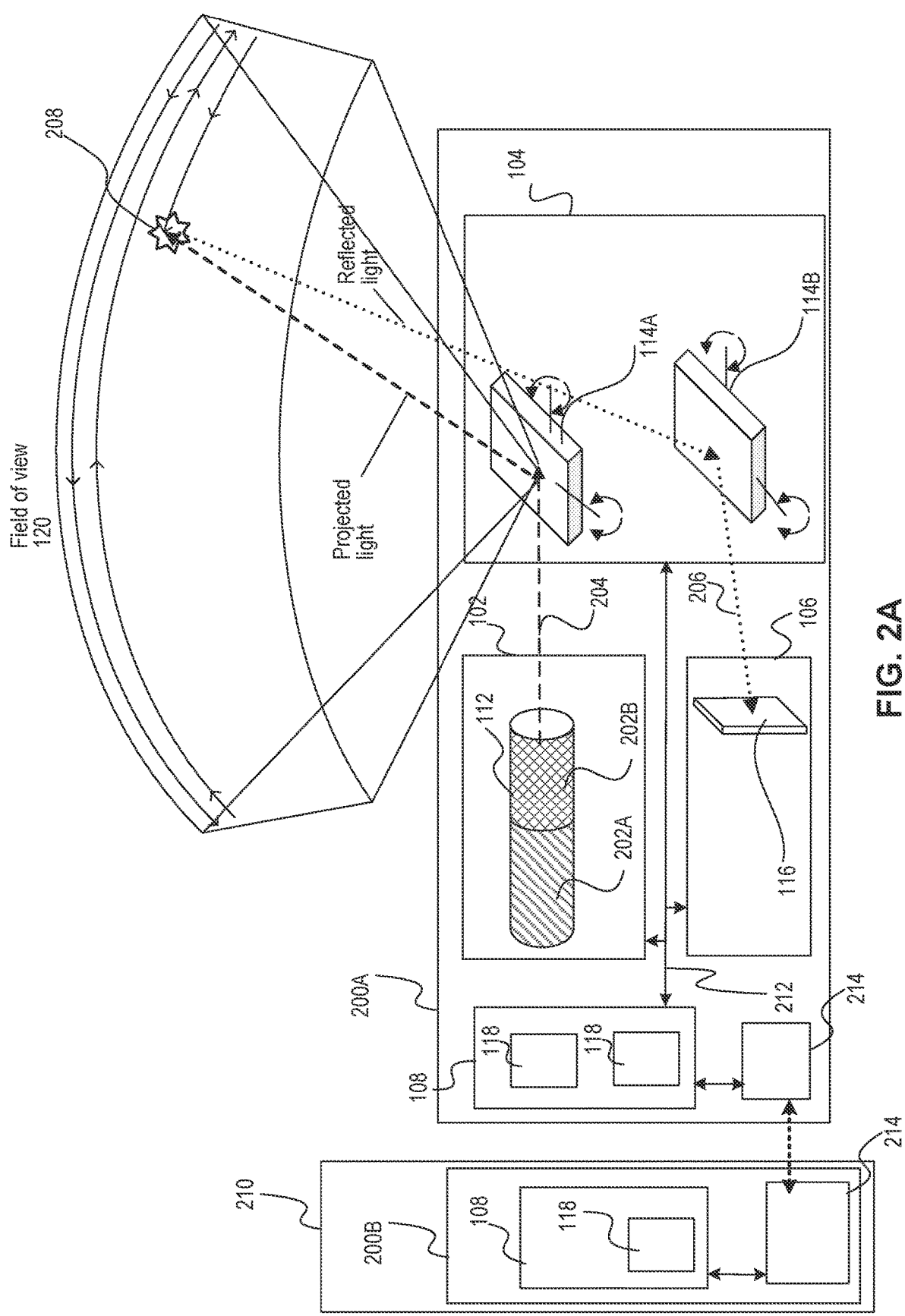

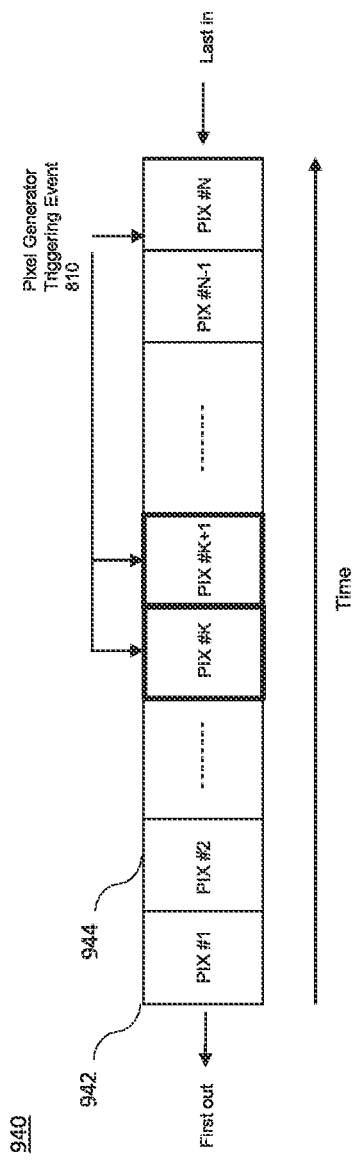
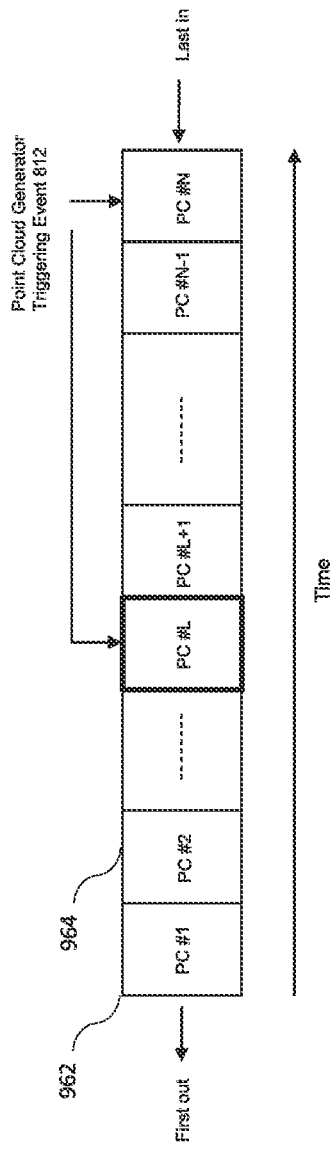
FIG. 9A
FIG. 9B

SYSTEMS AND METHODS FOR RETRIEVAL OF POINT CLOUD DATA FROM CACHE IN RESPONSE TO TRIGGERING EVENTS

TECHNICAL FIELD

The present disclosure relates generally to technology for scanning a surrounding environment and, for example, to systems and methods that use LIDAR technology to detect objects in the surrounding environment.

BACKGROUND

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. The measurements made by the sensor are used to generate point-cloud representations of an environment of the LIDAR system within the field of view of the LIDAR system. As a result, LIDAR systems can rapidly generate large amounts of data. Thus, especially after new LIDAR scan information is available, previously generated point clouds and/or object identification/classification information can be deleted or overwritten. In certain situations, however, it may be desirable to access historically acquired LIDAR point cloud information.

The systems and methods of the present disclosure are directed towards storing and providing access to historically acquired LIDAR point cloud information that can assist in recreating environmental and system conditions experienced by the LIDAR system or a host vehicle navigation system before, during, and/or after certain triggering events that initiate a capture of this information.

SUMMARY

The present disclosure is directed to a LIDAR system. The LIDAR system may include at least one light source configured to project laser light toward a field of view of the LIDAR system, at least one sensor configured to detect laser light reflections from objects in the field of view of the LIDAR system and at least one processor configured to perform operations. The processor may be configured to use the laser light reflections to generate point-cloud representations of an environment of the LIDAR system within the field of view of the LIDAR system, output navigational information based on the generated point-cloud representations to one or more processors associated with a vehicle on which the LIDAR system is mounted and store at least some of the generated point-cloud representations in a cache memory to provide a point-cloud archive. The processor may further be configured to detect occurrence of a point-cloud archive output triggering event, in response to detection of the point-cloud archive output triggering event, collect from the cache memory two or more point-clouds from the point-cloud archive that were generated within a predetermined period of time relative to the detected point-cloud archive output triggering event and output the two or more point clouds collected from the cache memory.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 2A and 2B are diagrams illustrating different configurations of projecting units in accordance with some embodiments of the present disclosure.

FIGS. 9A and 9B illustrate examples of a memory structure for a pixel data archive and a point cloud archive.

DETAILED DESCRIPTION

Figure 1:
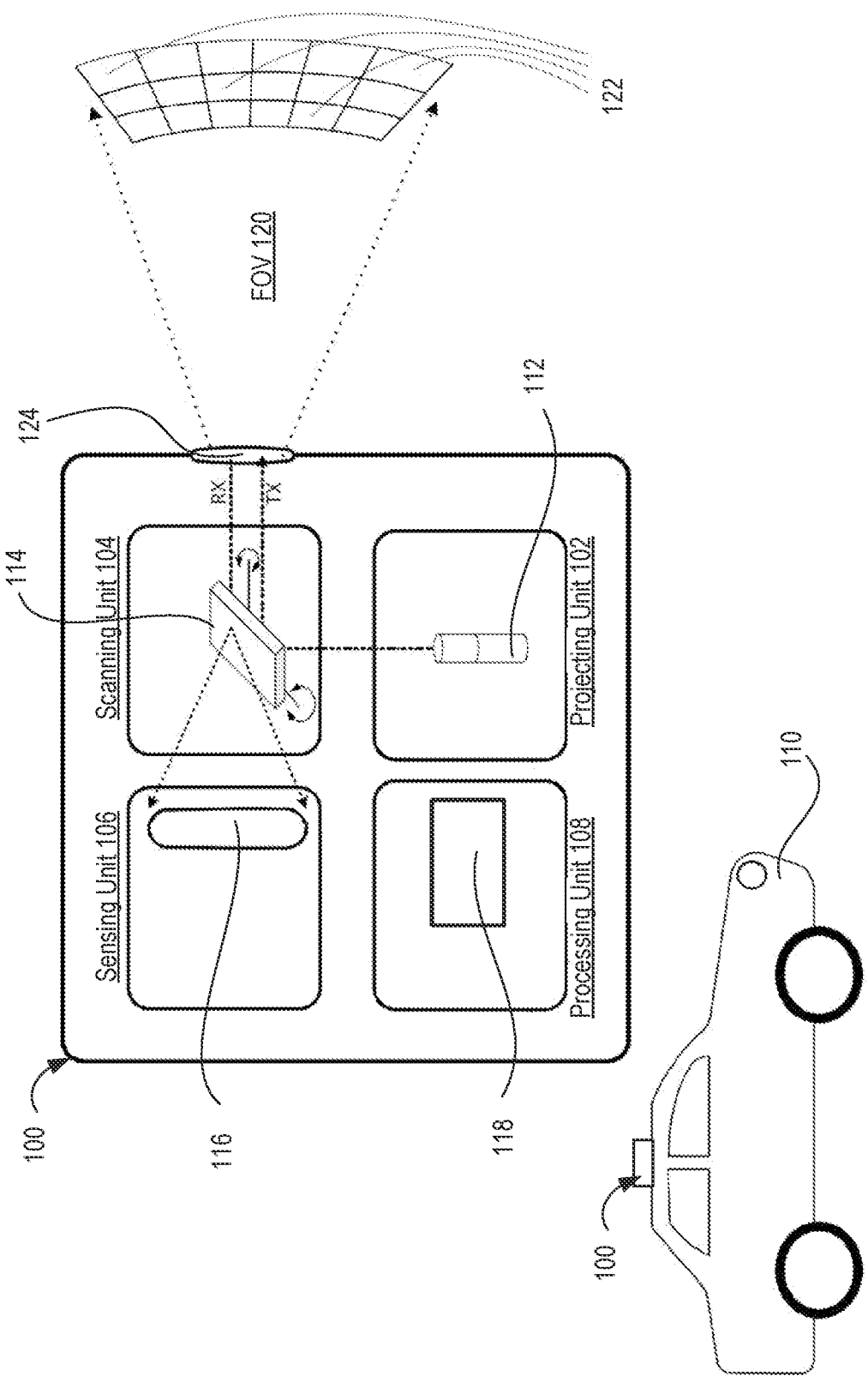
FIG. 1 is a diagram illustrating an exemplary LIDAR system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g., number of meters, number of inches, number of kilometers, number of millimeters), a number of arbitrary length units (e.g., number of LIDAR system lengths), a ratio between the distance to another length (e.g., a ratio to a length of an object detected in a field of view of the LIDAR system), an amount of time (e.g., given as standard unit, arbitrary units or ratio, for example, the time it takes light to travel between the tangible objects), one or more locations (e.g., specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g., by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g., location information (e.g., relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, +40°−20°, ±90° or 0°−90°).

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g., a location of the LIDAR system, a location on earth, or a location of another object). Additionally or alternatively, the term "detecting an object" may refer to identifying the object (e.g., classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g., cars, trees); at least partially liquid (e.g., puddles on the road, rain); at least partly gaseous (e.g., fumes, clouds); made from a multitude of distinct particles (e.g., sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g., laser beam projected onto a road or a building); in other cases, the object may be partly blocked by another object between the LIDAR system and the detected object; in other cases, the LIDAR's sensor may only detects light reflected from a portion of the object, e.g., because ambient light or other interferences interfere with detection of some portions of the object.

Consistent with the present disclosure, a LIDAR system may be configured to detect objects by scanning the environment of the LIDAR system. The term "scanning the environment of the LIDAR system" broadly includes illuminating the field of view or a portion of the field of view of the LIDAR system. In one example, scanning the environment of the LIDAR system may be achieved by moving or pivoting a light deflector to deflect light in differing directions toward different parts of the field of view. In another example, scanning the environment of LIDAR system may be achieved by changing a positioning (i.e. location and/or orientation) of a sensor with respect to the field of view. In another example, scanning the environment of the LIDAR system may be achieved by changing a positioning (i.e. location and/or orientation) of a light source with respect to the field of view. In yet another example, scanning the environment of the LIDAR system may be achieved by changing the positions of at least one light source and of at least one sensor to move rigidly with respect to the field of view (i.e. the relative distance and orientation of the at least one sensor and of the at least one light source remains).

As used herein the term "field of view of the LIDAR system" may broadly include an extent of the observable environment of the LIDAR system in which objects may be detected. It is noted that the field of view (FOV) of the LIDAR system may be affected by various conditions such as but not limited to: an orientation of the LIDAR system (e.g., is the direction of an optical axis of the LIDAR system); a position of the LIDAR system with respect to the environment (e.g., distance above ground and adjacent topography and obstacles); operational parameters of the LIDAR system (e.g., emission power, computational settings, defined angles of operation), etc. The field of view of the LIDAR system may be defined, for example, by a solid angle (e.g., defined using $\phi$, $\theta$ angles, in which $\phi$ and $\theta$ are angles defined in perpendicular planes, e.g., with respect to symmetry axes of the LIDAR system and/or its FOV). In one example, the field of view may also be defined within a certain range (e.g., up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, the LIDAR system may be configured to scan scenes in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g., earth, roads, grass, sidewalks, road surface marking), sky, man-made objects (e.g., vehicles, buildings, signs), vegetation, people, animals, light projecting elements (e.g., flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g., a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g., 1 cm$^3$), and whose location may be described by the point cloud model using a set of coordinates (e.g., (X,Y,Z), (r,$\phi$,$\theta$)). By way of example only, the point cloud model may store additional information for some or all of its points (e.g., color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light to deviate from its original path; for example, a mirror, a prism, controllable lens, a mechanical mirror, mechanical scanning polygons, active diffraction (e.g., controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g., a mirror), at least one refracting element (e.g., a prism, a lens), and so on. In one example, the light deflector may be movable, to cause light to deviate to differing degrees (e.g., discrete degrees, or over a continuous span of degrees). The light deflector may optionally be controllable in different ways (e.g., deflect to a degree a, change deflection angle by Aa, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively or in addition, the light deflector may optionally be operable to change an angle of deflection between predetermined settings (e.g., along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A and 3B.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementations, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g., non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of the light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g., mirror, prism), usually to a limited degree with respect to the maximal degree of change during a scanning of the field of view. For example, a scanning of the entire field of view of the LIDAR system may include changing deflection of light over a span of 30°, and the instantaneous position of at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g., atmospheric temperature, rain, etc.). In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIG. 5.

System Overview

FIG. 1 illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and watercraft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

It should be noted that LIDAR system 100 or any of its components may be used together with any of the example embodiments and methods disclosed herein. Further, while some aspects of LIDAR system 100 are described relative to an exemplary vehicle-based LIDAR platform, LIDAR system 100, any of its components, or any of the processes described herein may be applicable to LIDAR systems of other platform types.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflections signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1, LIDAR system 100 may include a single scanning unit 104 mounted on a roof of vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting multiple LIDAR systems 100 on vehicle 110, each with a single scanning unit 104. It is nevertheless noted that the one or more LIDAR systems 100 do not have to provide a complete 360° field of view, and that narrower fields of view may be useful in some situations. For example, vehicle 110 may require a first LIDAR system 100 having a field of view of 75° looking ahead of the vehicle, and possibly a second LIDAR system 100 with a similar FOV looking backward (optionally with a lower detection range). It is also noted that different vertical field of view angles may also be implemented.

The Projecting Unit

Figure 2B:
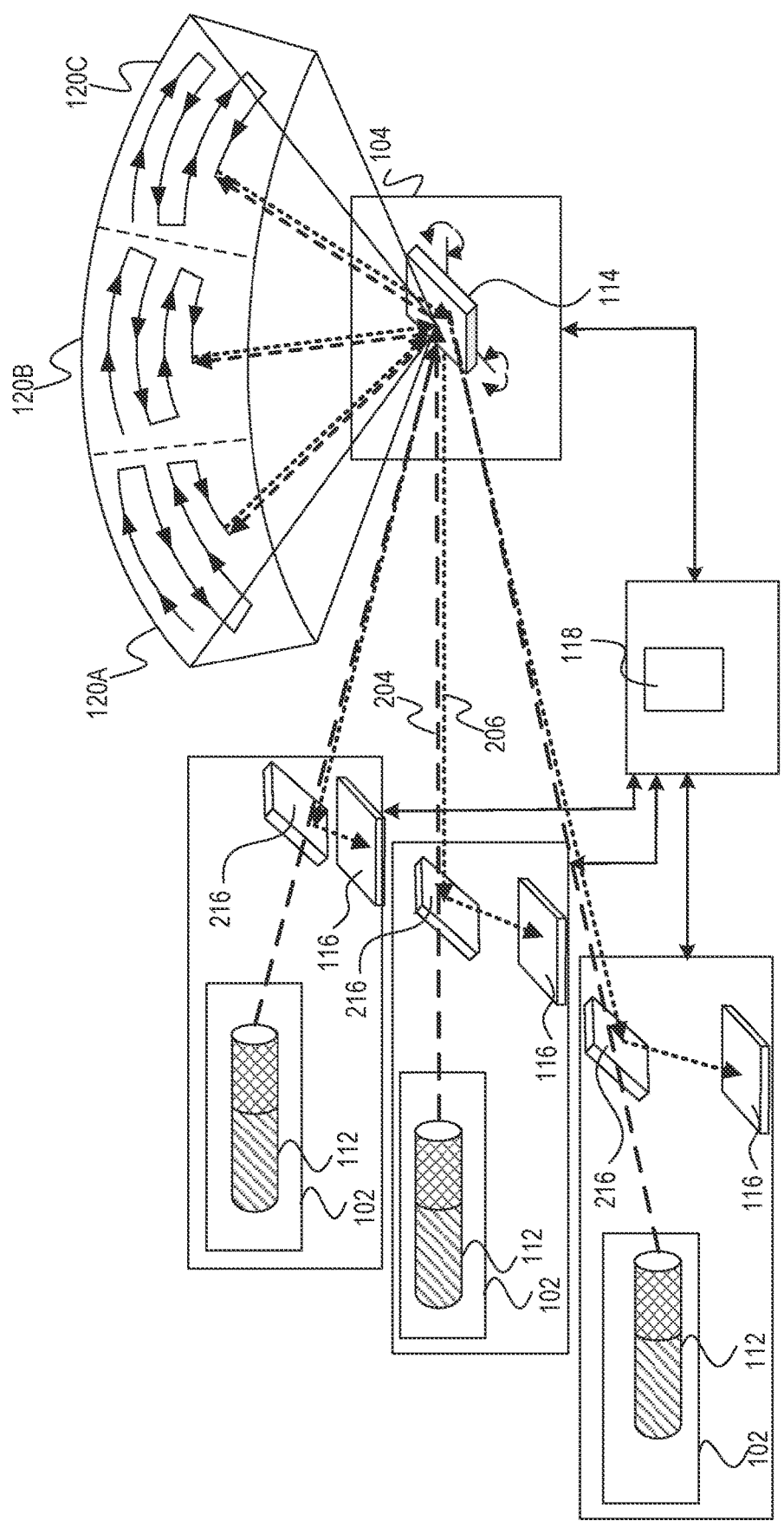

FIGS. 2A and 2B depict various configurations of projecting unit 102 and its role in LIDAR system 100. Specifically, FIG. 2A is a diagram illustrating projecting unit 102 with a single light source; and FIG. 2B is a diagram illustrating a plurality of projecting units 102 with a plurality of light sources aimed at a common light deflector 114. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through substantially different optical paths. In some embodiments, a bi-static configuration of LIDAR system 100 may include a separation of the optical paths by using completely different optical components, by using parallel but not fully separated optical components, or by using the same optical components for only part of the of the optical paths (optical components may include, for example, windows, lenses, mirrors, beam splitters, etc.). In the example depicted in FIG. 2A, the bi-static configuration includes a configuration where the outbound light and the inbound light pass through a single optical window 124 but scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources).

In this embodiment, all the components of LIDAR system 100 may be contained within a single housing 200, or may be divided among a plurality of housings. As shown, projecting unit 102 is associated with a single light source 112 that includes a laser diode 202A (or two or more laser diodes coupled together) configured to emit light (projected light 204). In one non-limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g., for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 may also include a pivotable return deflector 114B that direct photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such a computing environment may include at least one processor and/or may be connected to LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g., a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g., cameras, microphones, radar systems). In one example, LIDAR system 100 may be used by a security system.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated service digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In another embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR system configurations in which the projected light exiting from the LIDAR system and the reflected light entering the LIDAR system pass through substantially similar optical paths. In one example, the outbound light beam and the inbound light beam may share at least one optical assembly through which both outbound and inbound light beams pass. In another example, the outbound light may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hit an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical deflector 216 may include an optical isolator that allows the passage of light in only one direction. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

The Scanning Unit

Figure 3A:
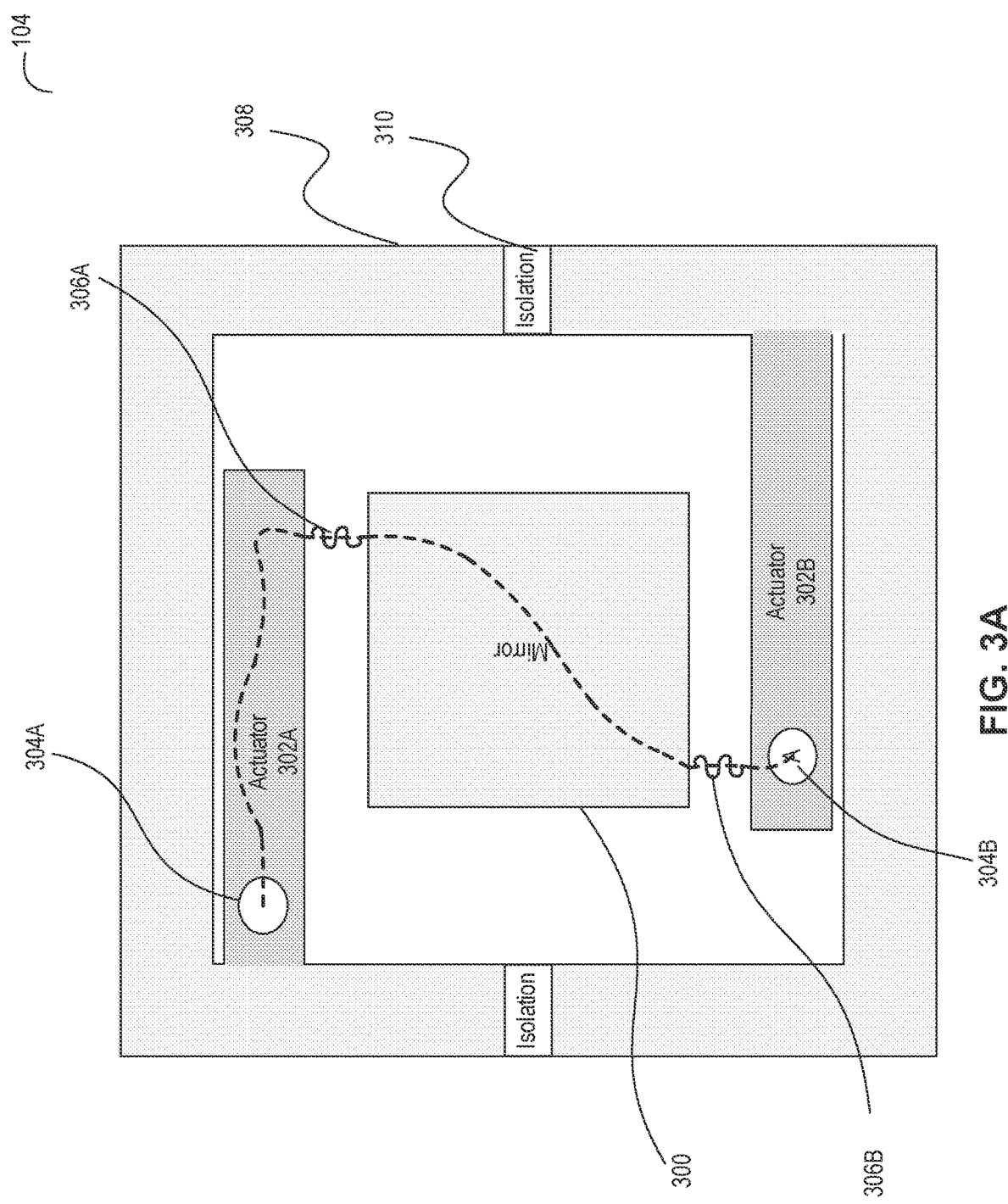
FIGS. 3A and 3B are diagrams illustrating different configurations of scanning units in accordance with some embodiments of the present disclosure.
Figure 3B:
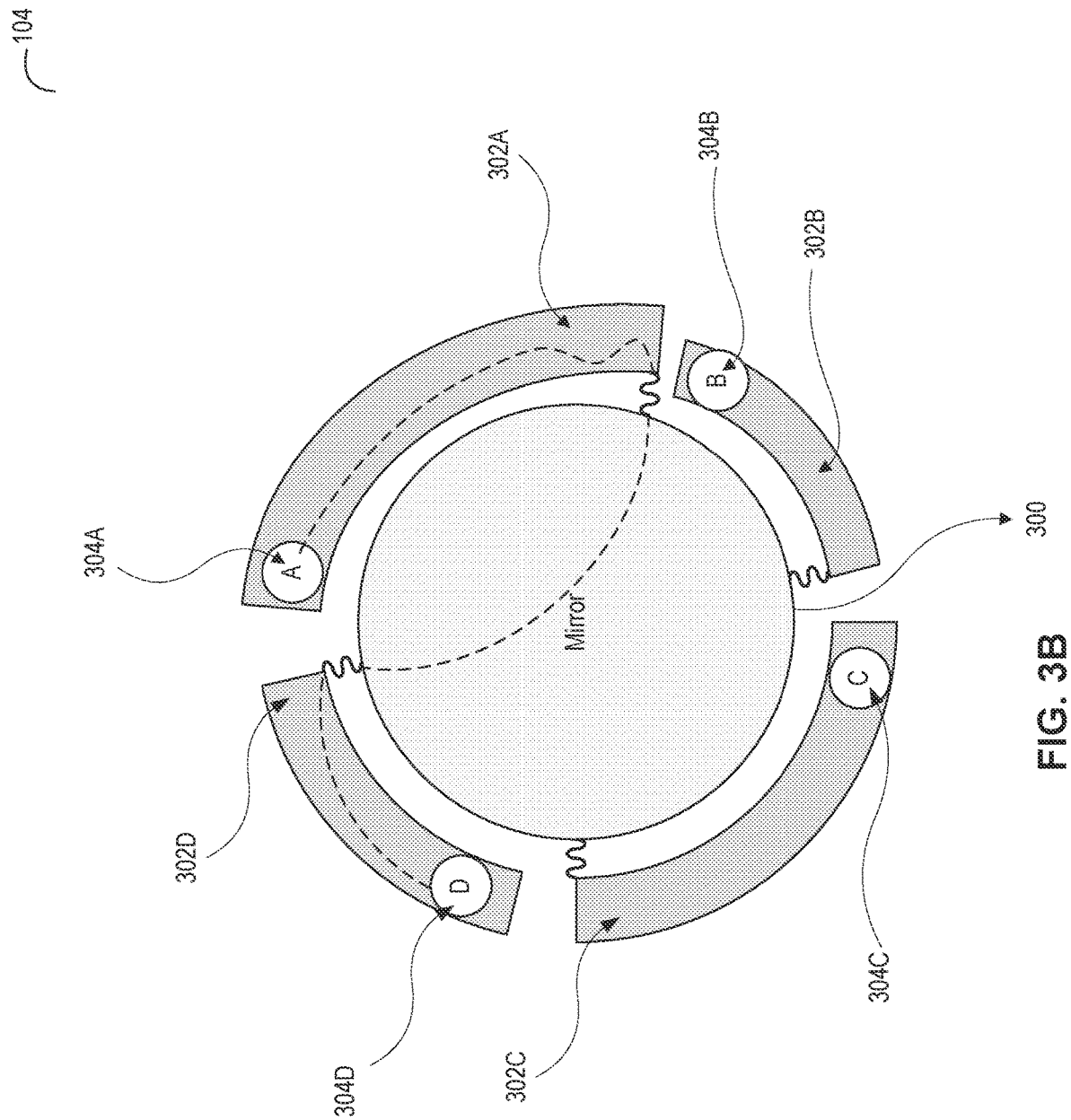

FIGS. 3A and 3B depict various configurations of scanning unit 104 and its role in LIDAR system 100. Specifically, FIG. 3A is a diagram illustrating scanning unit 104 with a MEMS mirror (e.g., square shaped), and FIG. 3B is a diagram illustrating another scanning unit 104 with a MEMS mirror (e.g., round shaped. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g., PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 32-34.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be monitored by an associated position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least one deflector 114 may have a dual axis square-shaped mirror or single axis round-shaped mirror. Examples of round and square mirrors are depicted in FIGS. 3A and 3B as examples only. Any shape may be employed depending on system specifications. In one embodiment, actuators 302 may be incorporated as an integral part of at least of deflector 114, such that power to move MEMS mirror 300 is applied directly towards it. In addition, MEMS mirror 300 may be connected to frame 308 by one or more rigid supporting elements. In another embodiment, at least one deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance.

The Sensing Unit

Figure 4A:
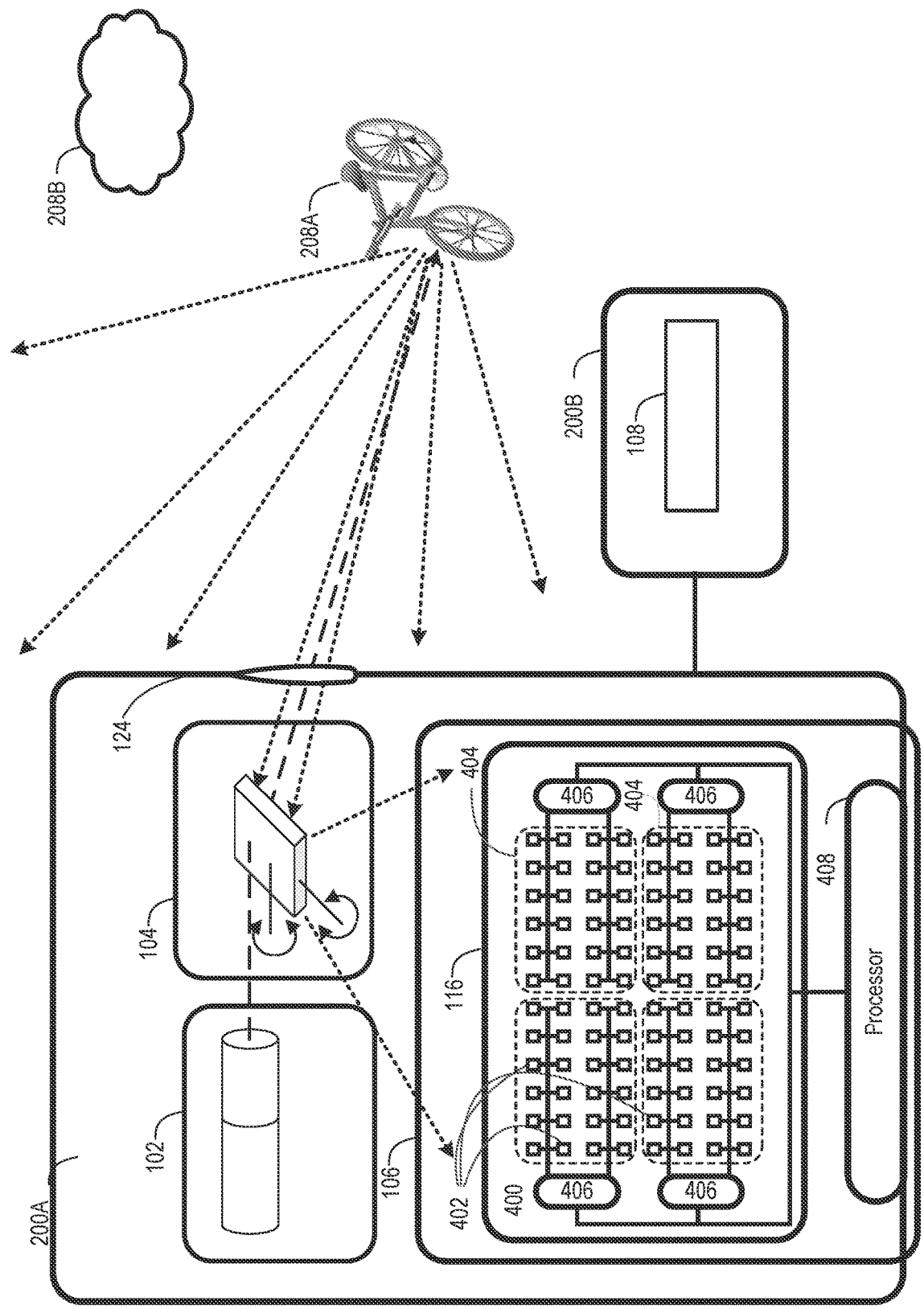
FIGS. 4A and 4B are diagrams illustrating different configurations of sensing units in accordance with some embodiments of the present disclosure.
Figure 4B:
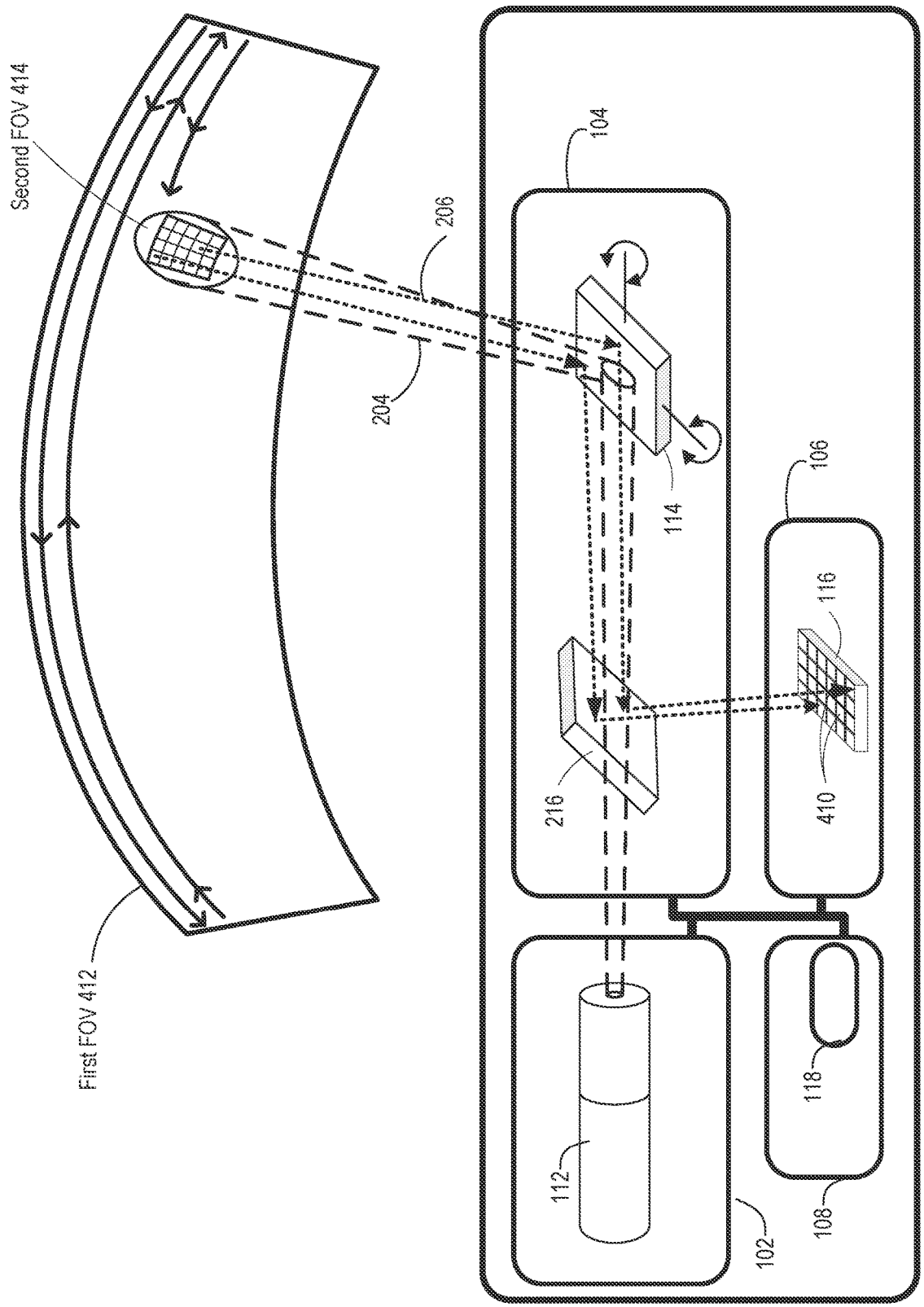

FIGS. 4A and 4B depict various configurations of sensing unit 106 and its role in LIDAR system 100. Specifically, FIG. 4A is a diagram illustrating an example sensing unit 106 with a detector array, and FIG. 4B is a diagram illustrating monostatic scanning using a two-dimensional sensor. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g., a road, a tree, a car, a person), fluid object (e.g., fog, water, atmosphere particles), or object of another type (e.g., dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g., as shown) or any other arrangement. Detection elements 402 may operate concurrently or partially concurrently with each other. Specifically, each detection element 402 may issue detection information for every sampling duration (e.g., every 1 nanosecond). In one example, detector array 400 may be a SiPM (Silicon photomultipliers) which is a solid-state single-photon-sensitive device built from an array of single photon avalanche diodes (SPADs, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g., SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g., within detector array 400)—and may be shaped in different shapes (e.g., rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the region of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g., within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e.g., summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g., row, column) of detectors 410 in two non-parallel axes (e.g., orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) Also, sensor 116 may be a one-dimensional matrix (e.g., 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 412" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 412 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly Consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal point (e.g., the focal point may be a plane) to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent to each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

It is noted that the one or more sensors 116 of system 100 may receive light from a scanning deflector 114 or directly from the FOV without scanning. Even if light from the entire FOV arrives to the at least one sensor 116 at the same time, in some implementations the one or more sensors 116 may sample only parts of the FOV for detection output at any given time. For example, if the illumination of projection unit 102 illuminates different parts of the FOV at different times (whether using a deflector 114 and/or by activating different light sources 112 at different times), light may arrive at all of the pixels or sensors 116 of sensing unit 106, and only pixels/sensors which are expected to detect the LIDAR illumination may be actively collecting data for detection outputs. This way, the rest of the pixels/sensors do not unnecessarily collect ambient noise. Referring to the scanning—in the outbound or in the inbound directions—it is noted that substantially different scales of scanning may be implemented. For example, in some implementations the scanned area may cover 1% c or 0.1% c of the FOV, while in other implementations the scanned area may cover 10% or 25% of the FOV. All other relative portions of the FOV values may also be implemented, of course.

The Processing Unit

Figure 5:
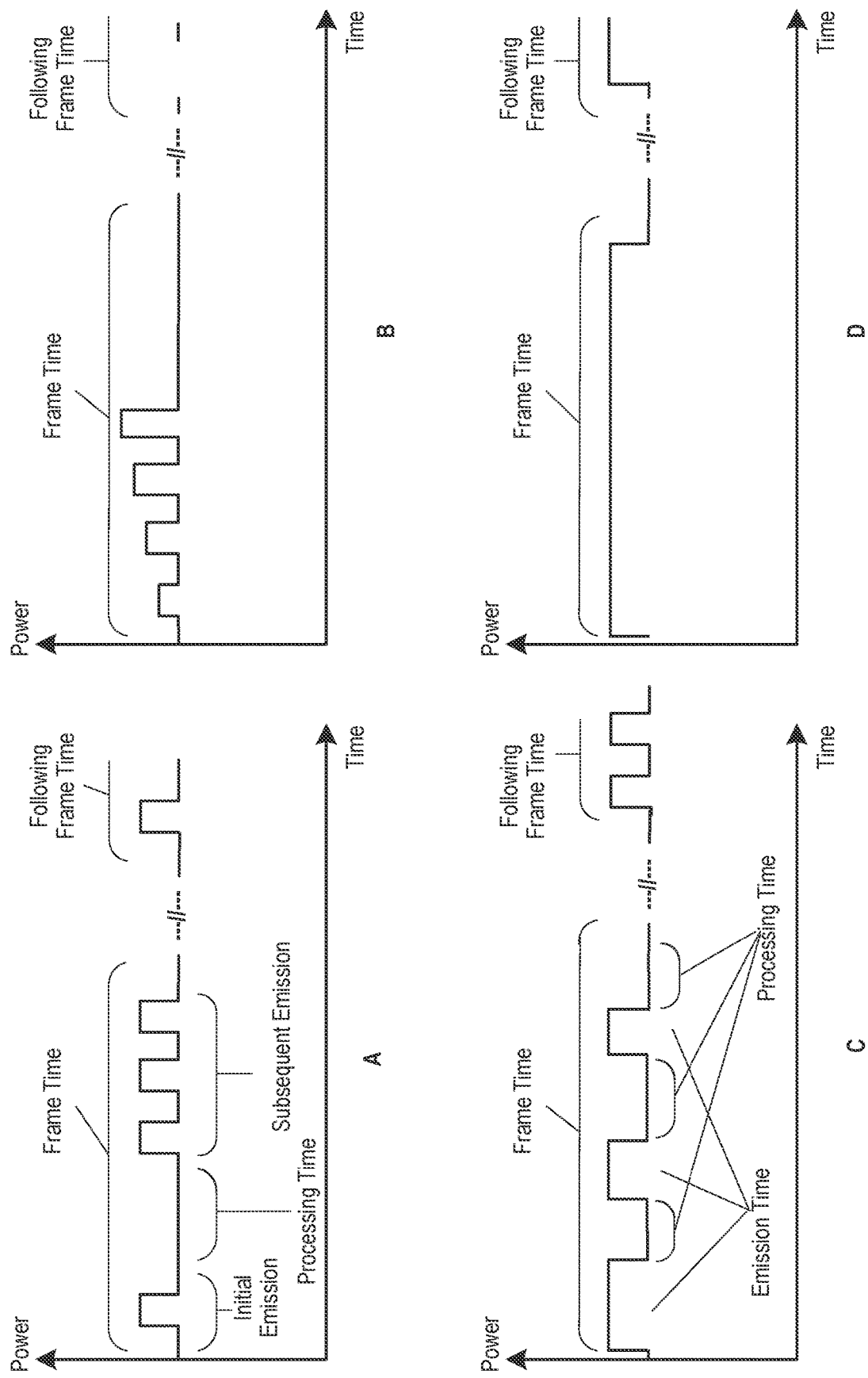
FIG. 5 includes four example diagrams illustrating emission patterns in a single frame-time for a single portion of the field of view.

FIG. 5 depicts different functionalities of processing units 108 in accordance with some embodiments of the present disclosure. Specifically, FIG. 5 is a diagram illustrating emission patterns in a single frame-time for a single portion of the field of view. FIG. 5 illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5 depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g., one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g., for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame).

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g., 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following:
 a. Overall energy of the subsequent emission.
 b. Energy profile of the subsequent emission.
 c. A number of light-pulse-repetition per frame.
 d. Light modulation characteristics such as duration, rate, peak, average power, and pulse shape.
 e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g., regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined upon after every pulse emitted, or after a number of pulses emitted.

Processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g., camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Additional details and examples on different components of LIDAR system 100 and their associated functionalities are included in Applicant's United States Patent Application Publication Nos. 2018/0100928 published Apr. 12, 2018; 2018/0113216 published Apr. 26, 2018; 2018/0081037 published Mar. 22, 2018; and 2018/0081038 published Mar. 22, 2018, which are incorporated herein by reference in their entirety.

Example Implementation: Retrieval of Point Cloud Data from Cache in Response to Triggering Events LIDAR systems may scan a field of view at rates of 10 frames per second, 20 frames per second, 30 frames per second or more, and each scan may include thousands of data points generated. As a result, LIDAR systems can rapidly generate large amounts of data. During operation, a host vehicle on which a LIDAR system is deployed may receive from the LIDAR system (e.g., at a navigational system associated with the host vehicle) generated point clouds, identifications/classifications of detected objects, etc. This information may be stored by the LIDAR system or a host vehicle navigation system (e.g., in a cache) while processing is performed on the information and navigational decisions are made relative to the information. As new LIDAR point cloud and/or object identification/classification information may be generated/supplied by the LIDAR system many times per second, once a set of LIDAR information has been processed, it is generally cleared from memory or overwritten to make space for newly generated LIDAR data. Further, as an environment surrounding a LIDAR system or a host vehicle continues to change as the vehicle navigates relative to the environment, and navigational decisions typically depend on currently sensed conditions rather than conditions experienced in the past, LIDAR systems and host vehicle navigation systems do not have a need for long-term storage of generated point clouds and object identification/classification information. Thus, especially after new LIDAR scan information is available, previously generated point clouds and/or object identification/classification information can be deleted or overwritten.

In some cases, however, it may be desirable to access historically acquired LIDAR point cloud information. Such information can assist in recreating environmental and system conditions experienced by the LIDAR system or a host vehicle navigation system before, during, and/or after certain triggering events. Many types of triggering events may prompt interest in access to historical LIDAR data. For example, in response to an indication that the LIDAR system is not performing properly, or such as indications of inconsistency between outputs of sensors associated with the vehicle; after an operator override of an ADS or ADAS feature associated with the vehicle, in response to an incorrect classification of a detected object; or after detection of an accident involving the host vehicle, there may be a need/interest in analyzing point cloud information generated by the LIDAR system to reconstruct the conditions experienced by the host vehicle/LIDAR system during the triggering event, and to diagnose system faults.

Point clouds and datasets upon which such point clouds are generated may include many thousands or even millions of points. And, as such point clouds may be generated many times per second, there is the capability for a LIDAR system to generate huge volumes of data. While access to the full volume of generated data may be advantageous (e.g., in recreating the conditions associated with a particular triggering event), indiscriminate capture and storage of the full volume of point cloud information is prohibitive. For example, a full archival approach would require huge storage units, as terabytes worth of data can be generated in a relatively short time. Thus, there is a need for solutions that allow for efficient storage of LIDAR point clouds for later access and analysis.

Collecting LIDAR validation data may be a lengthy and costly process. For example, in-field collection of validation data requires system storage to save recordings. Alternatively, the data may be communicated wirelessly to a remote server. Both of these methods generate significant cost if data is saved indiscriminately. However, a system may be configured to detect the scenarios that may be valuable to save (e.g. to improve the performance of a LIDAR component), it may save these scenarios discriminately depending on defined triggers.

Various types of LIDAR systems may be used in conjunction with the presently disclosed embodiments. Details relating to at least some such LIDAR systems are provided in other sections of this disclosure. In one embodiment, LIDAR system 100 (FIG. 1A) includes projecting unit 102 to project laser light towards field of view 120 and sensing unit 106 configured to detect laser light reflections from objects in field of view 120. LIDAR system 100 further includes processing unit 108 which is configured to use the laser light reflections to generate point-cloud representations of an environment of LIDAR system 100 within field of view 120. Processing unit 108 may be further configured to output navigational information, including point-cloud representations or information determined based on the generated point-cloud representations, to one or more processors associated with a vehicle on which LIDAR system 100 is mounted.

Processing unit 108 may store at least some of the generated point-cloud representations and/or associated information in a cache memory to provide a point-cloud archive. The cache memory may include a volatile memory unit, which maintains stored data as long as power is supplied to the memory unit. When a triggering event is detected, processing unit 108 collects from the cache memory archived point-cloud representations or other point-cloud based information generated within a predetermined period of time relative to the triggering event. The retrieved point-cloud data may be output from the LIDAR system to one or more processors onboard a host vehicle, may be output to a non-volatile memory (e.g., black box), or may be transmitted to a remote location. Implementing a cache memory allows for storage of point-cloud data that can be quickly accessed when needed. Such a cache memory also allows data to be stored for temporary use. For example, the cache memory may maintain archived point cloud information representative of a certain predetermined time window, but once the archive associated with that time window is filled, older point cloud information in the point cloud archive may be overwritten by newer point cloud information.

Figure 6:
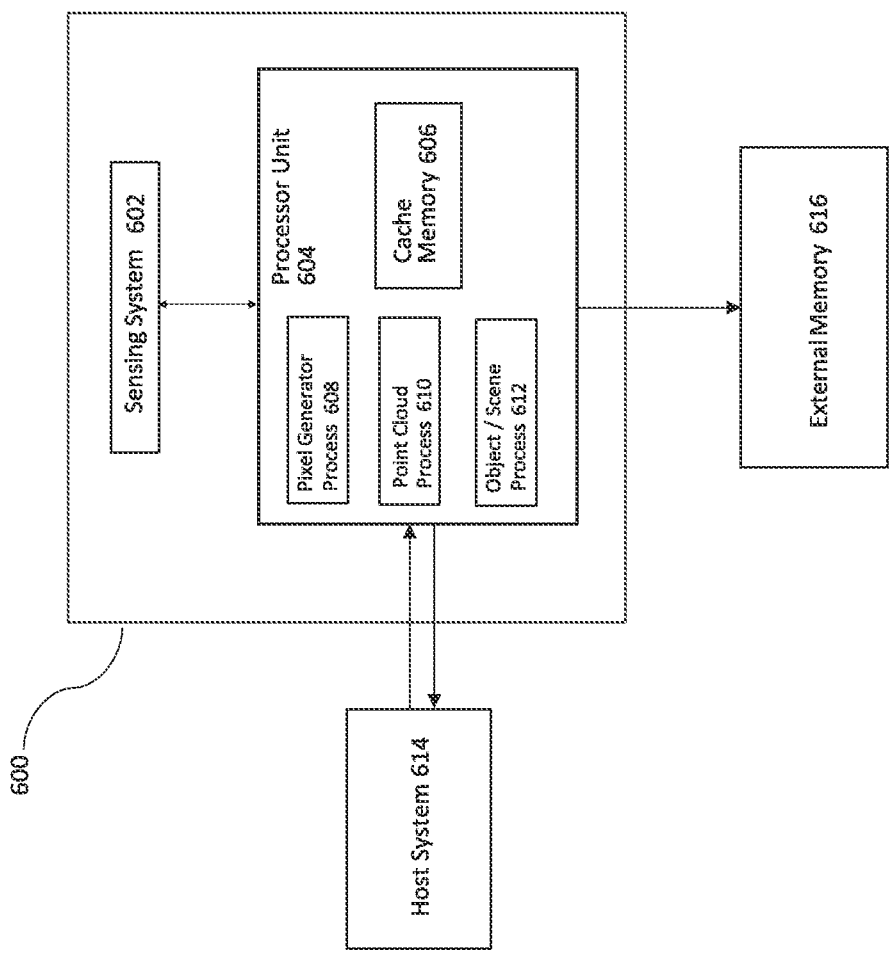
FIG. 6 is a diagram illustrating the processor architecture consistent with some embodiments of the present disclosure.

In an illustrative embodiment, a LIDAR system may provide system in-field LIDAR data collection for the purpose of recreating environmental and system conditions experienced by the LIDAR system before, during, and/or after certain triggering events. The captured historical in-field LIDAR data may be used for training, debugging and improving detection of the LIDAR system. FIG. 6 provides a block diagram representation of a LIDAR processor architecture 600. In the illustrative embodiment, the LIDAR processor architecture 600 may include a sensing system 602 and a processor unit 604 that may implement a pixel generator process 608, a point cloud process 610 and an object/scene process 612. The processor unit 604 may include a cache memory 606 for storage of archive data consistent with embodiments described in the present disclosure. Additionally shown are a network interface with a host system 614 and an external memory 616. In the illustrative embodiment, the sensing system 602 may include at least one light source configured to project laser light toward a field of view of the LIDAR system 600 and at least one sensor configured to detect laser light reflections from objects in the field of view of the LIDAR system 600. Additionally, the processor unit 604 may be configured to use the laser light reflections to generate point-cloud representations of an environment of the LIDAR system within the field of view of the LIDAR system. The processor unit 604 may process the received data in a pixel generator process 608, a point cloud process 610 and an object/scene process 612. The pixel generator process 608 may take input data from the sensing unit 602 and create pixel data to be used for generation of one or more point-cloud representations. The point cloud process 610 may create the one or more point-cloud representations. The object/scene process 612 may implement object and scene identification based on a point cloud representation data input. It is to be appreciated that point cloud process 610 and object/scene process 612 may be implemented external to the LIDAR sensor, for example, by a host processor. The processor unit 604 may have associated cache memory 608 to store point cloud data in one or more point cloud archives or may have access to external memory 616 for bulk non-volatile storage for point cloud data. A host interface 614 may be used for external requests from the host system representing a point cloud archive output triggering event or to receive two or more point clouds from the point cloud archive in response to a point cloud archive output triggering event generated local to the LIDAR system 600.

Figure 7:
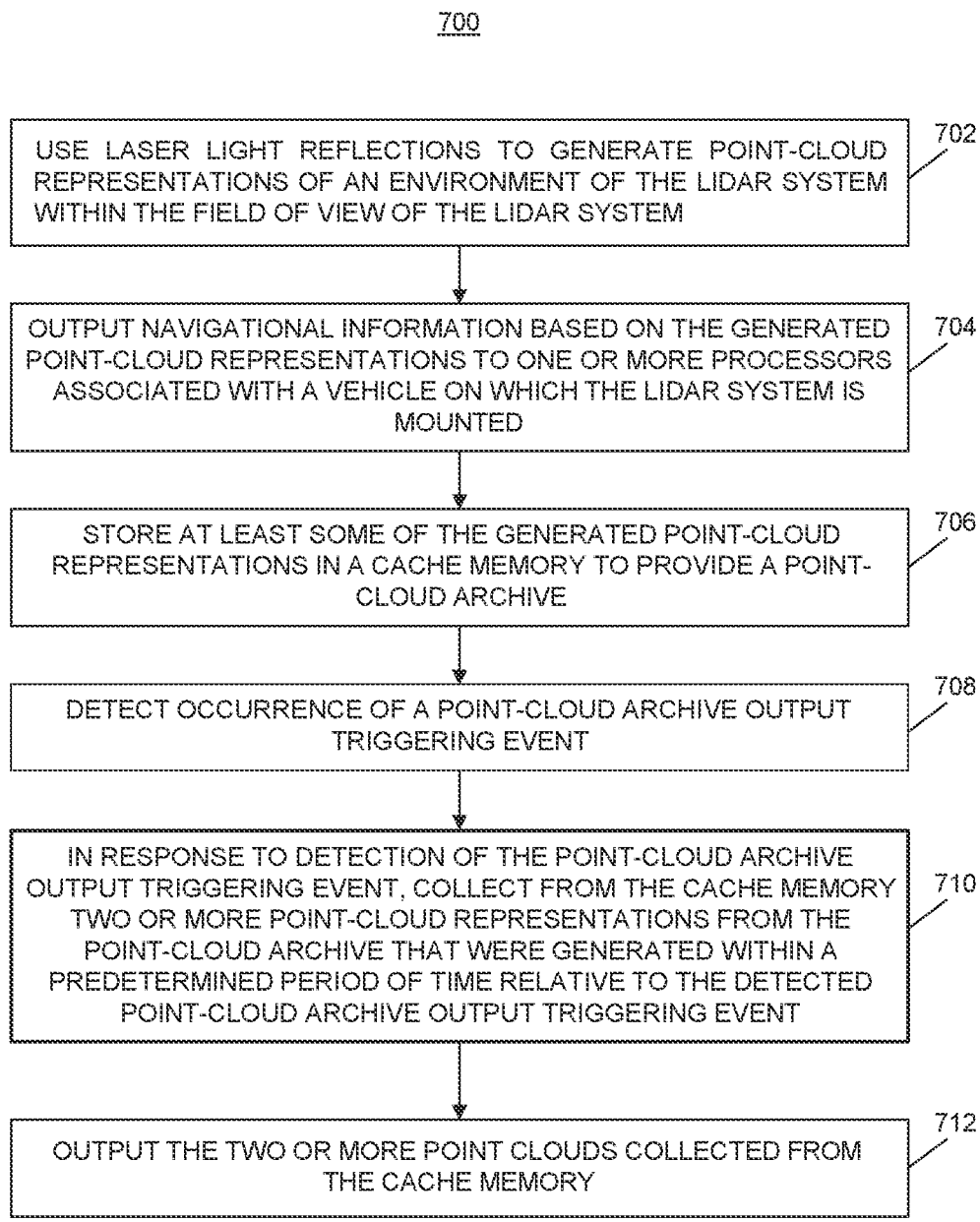
FIG. 7 is a flow chart of an example method for retrieval of point cloud data from cache consistent with some embodiments of the present disclosure.

FIG. 7 depicts an example method 700 for retrieval of point cloud data from cache consistent with this disclosure. Method 700 may be executed by at least one processor, such as a processor of LIDAR system 100 (e.g., at least one processor 118 of processing unit 108 in the example of FIG. 1A, two processors 118 of processing unit 108 of FIG. 2A, or the like). It is noted that method 700 may be implemented by any type of LIDAR system, and not necessarily by LIDAR system 100. For example, method 700 may be executed by a scanning or a non-scanning LIDAR system, by a pulsed or continuous-wave LIDAR system, or the like.

As described in other sections of this disclosure, in some examples, the LIDAR system includes at least one light source configured to project laser light toward a field of view of the LIDAR system. For example, as depicted in FIG. 2E, projecting unit 102 is configured to project light toward a field of view. The disclosed embodiments, may also include at least one sensor configured to detect laser light reflections from objects in the field of view of the LIDAR system. For example, as depicted in FIG. 4B, sensing unit 106 with sensor 116 comprised of a plurality of detectors 410 (also referred to as "pixels") may include camera, LIDAR, radar, or any other imaging systems configured to receive light reflections from objects in the field of view of LIDAR system 100. Measurements from each detector 410 may enable determination of the time of flight from a light pulse emission event to the reception event and the intensity of the received photons.

Figure 10A:
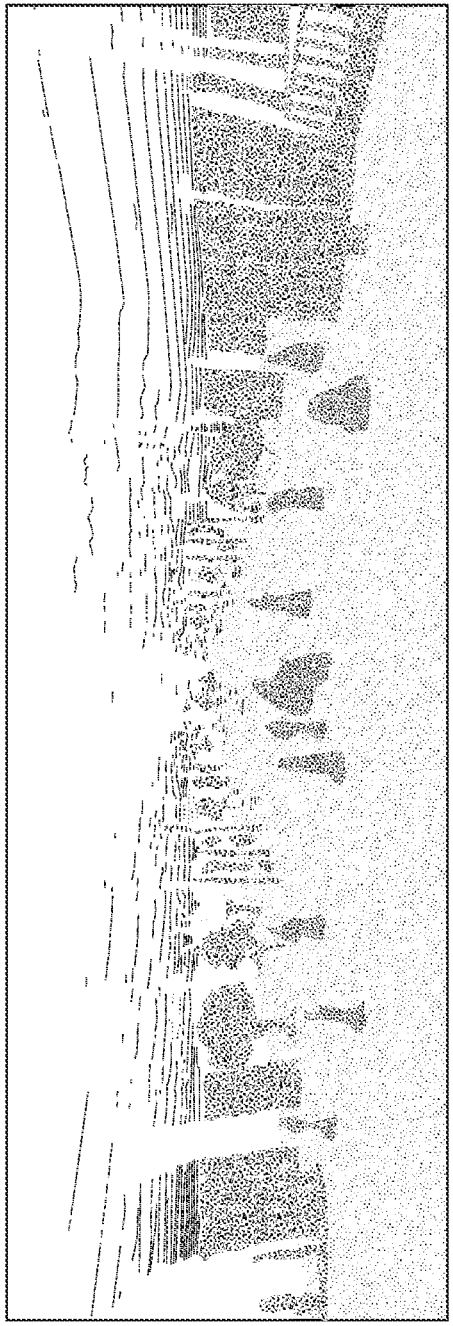
FIGS. 10A and 10B are example point cloud images consistent with some embodiments of the present disclosure.
Figure 10B:
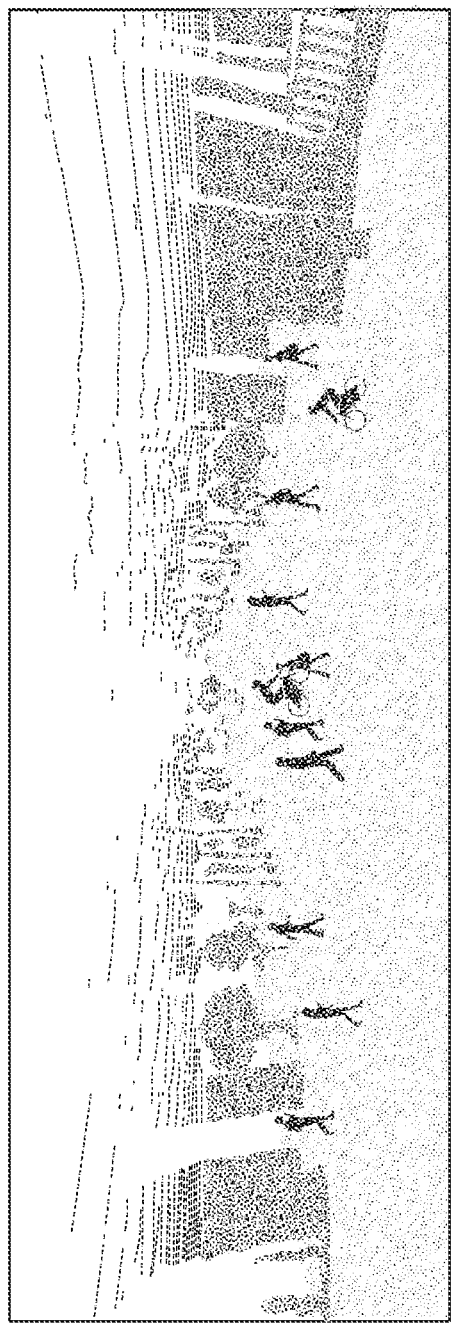

At step 702, the at least one processor is configured to use the laser light reflections to generate point-cloud representations of an environment of the LIDAR system within the field of view of the LIDAR system. For example, processing unit 108 generates a point cloud including distance information relative to objects in field of view 120 of LIDAR system 100 based on output signals generated by sensing unit 106 in response to received laser light return signals reflected from objects in field of view 120. FIGS. 10A and 10B provide example point cloud representations for a scene determined from the output of LIDAR system 100. Generating the point-cloud representation may include generating a plurality of point cloud data point entries from the detected reflections received in response to scanning of the field of view. Each data point in the point cloud may be associated with a particular spatial location relative to the field of view and a distance value or range value between the LIDAR system and an object (or portion of an object) at the particular spatial location relative to the field of view. Other information may be associated with each point cloud data point, such as object reflectivity and/or intensity of the returned reflection signal at the particular spatial location.

The generated point cloud can be analyzed to determine attributes associated with detected objects (e.g., those that return one or more laser light reflections) in the environment of the LIDAR system. For example, using various segmentation and/or shape identification algorithms, individual detected objects may be identified, and the identified objects may be classified (e.g., pedestrian, vehicle, building, traffic light, traffic sign, etc.). Additionally, or alternatively, such identification and classification may be performed by one or more trained neural networks.

Various types of information may be provided by LIDAR system 100 to one or more systems of the host vehicle, such as a host vehicle navigation system. For example, returning to FIG. 7, at step 704, processor 118 may output navigational information based on the generated point-cloud representations to one or more processors associated with a vehicle on which the LIDAR system is mounted. In some cases, the navigational information may include one or more generated point-cloud representations of the field of view or one or more portions of a generated point cloud (e.g., a region of a point cloud corresponding to a detected object or a region of interest).

In other cases, however, navigational information other than a point cloud or point cloud portion may be output by LIDAR system 100. For example, in some embodiments, the navigational information may include one or more identifiers and one or more range values associated with one or more objects detected in the environment of the LIDAR system. For example, the one or more identifiers may provide descriptive information related to the one or more detected objects, such as object size, shape, reflectivity, velocity, etc. In some examples, the one or more identifiers may also include an object type classifier associated with one or more objects detected in the environment of the LIDAR (e.g., pedestrian, vehicle, traffic light, traffic sign, road surface, etc.). The navigational information may also identify a region of the field of view in which a particular detected object is located. And, of course, the navigational information may also specify the range or distance values associated with detected objects or portions of detected objects.

At step 706, at least some of the generated point cloud representations may be stored in a memory to provide a point cloud archive. This cache memory may be associated with the LIDAR system or with a host vehicle system, such as a navigation system. In some embodiments, the cache memory includes at least one volatile memory unit (e.g., RAM, etc.). The point cloud archive may include any number of point clouds generated during operation of the LIDAR system. In some examples, some or all point clouds generated since the system powered on may be stored in the point cloud archive. To limit the memory resources and to potentially speed access to information of interest, in other cases, only some of the generated point clouds are stored in the cache. As discussed above, one of the features of the presently disclosed systems is an ability to detect a certain type of event of interest (e.g., a point-cloud archive output triggering event) and to gather information from the point cloud archive stored prior to this triggering event to potentially enable reconstruction of the conditions experienced by the LIDAR system at least leading up to the triggering event. When a triggering event will occur is unknown, but in order to reconstruct conditions existing prior to the triggering event based on point cloud information, the point cloud archive should include point clouds generated prior to the triggering event.

The point cloud archive may store any number of generated point clouds. In one example, all of the generated point clouds can be stored in the point cloud archive. For example, a certain number of point clouds may be maintained in the cache portion of the archive (e.g., point clouds generated during the last 2 seconds, 5 seconds, 10 seconds, 30 seconds, etc. of LIDAR system operation and stored in a volatile memory. Other generated point clouds (e.g., older point clouds) may be stored in a non-volatile portion of the archive, such as a disk drive, etc. Such an approach would ensure availability of point cloud data for any time period during operation of the LIDAR system and prior to a triggering event. This approach, however, may require significant memory and processing resources.

In other cases, therefore, only a portion of the generated point clouds may be stored in the archive. Different types of triggering events may be associated with different point cloud retrieval windows of time. For example, in the case of a vehicle accident, only those point clouds generated seconds before the event may be of interest. In other cases, however, longer retrieval windows may be of interest. To ensure that the point clouds generated in a desired time window prior to a triggering event are available, the archive can be populated with point clouds generated within the longest expected retrieval window. This window of stored point clouds can be maintained as a rolling time window of any suitable or desired length of time. For example, assuming the window of interest is one minute in length, all of the point clouds generated within the first minute of operation of the LIDAR system may be stored in the point cloud archive. After the initial one minute period has elapsed, the point clouds stored in the archive may be maintained on a first in, first out basis, such that the oldest point cloud stored in the archive is replaced by the newest generated point cloud. In this way, the archive is configured to store a rolling time window of generated point clouds. Once a triggering event is detected, the point clouds generated within a predetermined period of time (e.g., specific to the type of detected event) can be retrieved from the point cloud archive. Thus, the generated point-cloud representations may be stored on a first in, first out basis after obtaining an initial group of point-cloud representations corresponding to the rolling time window.

In some cases, the predetermined period of time of point cloud retrieval from the archive may vary. For example, the predetermined period of time may include a total time from a last power-on event associated with the LIDAR system. In this mode of operation, all point-cloud representations could be stored in the cache for a vehicle drive from the moment the LIDAR system 100 powers on to the moment LIDAR system 100 powers off. And, where a triggering event is detected, all of the generated point clouds included in the archive may be retrieved, which would include all generated point-cloud representations in a variable time period measured from the last power-on event of LIDAR system 100 (perhaps with the exception of certain point clouds generated as part of an internal calibration or other setup process prior to normal operation of the LIDAR system). In other cases, while all generated point clouds may be stored in the archive, detection of a triggering event may result in retrieval of only a portion of the point clouds stored in the archive. The time window associated with the retrieved point clouds may be determined based on a detected type of triggering event. For example, certain types of triggering events (e.g., host vehicle accident, etc.) may require retrieval of more or fewer archived point clouds, as compared to other types of triggering events (e.g., discrepancies associated with sensor drift over time, etc.).

It should be emphasized that, just as the generated point clouds may be stored in the point cloud archive according to a rolling time window, the predetermined period of time for which stored point clouds are retrieved from the point cloud archive may also correspond to a rolling time window. For example, regardless of whether all generated point clouds are stored in the archive or only those point clouds associated with a rolling time window are stored in the archive, the predetermined period of time for which generated point clouds are retrieved from the archive may also correspond to a rolling time window of a certain predetermined time duration. For example, the predetermined length of a rolling time window for which generated point clouds are retrieved from the archive may correspond to the 0.5 seconds, 1 second, 2 seconds, 5 seconds, 10 seconds, etc. prior to a detected triggering event. And, the length of the rolling time window for point cloud retrieval may depend on the detected type of triggering event. For example, the predetermined time period for which generated point clouds are retrieved from the point cloud archive may vary, e.g., based on the type of triggering event. That is, in some embodiments, the predetermined period of time is determined based on a type classifier associated with the detected point-cloud archive output triggering event.

Returning to FIG. 7, at step 708, the at least one processor may detect occurrence of a point-cloud archive output triggering event. Various types of detected events may result in retrieval from the point cloud archive of generated point clouds. In one example, the point-cloud archive output triggering event may include a detected inconsistency between outputs of two or more sensors associated with the vehicle. In some examples, the two or more sensors include at least one camera in addition to the LIDAR system. For example, processing unit 108 may generate a point cloud based on output signals provided by LIDAR sensors of sensing unit 106 in response to received laser light return signals. The generated point cloud may be compared to one or more acquired images, whether the acquired images are generated based on outputs from the LIDAR system sensors (e.g., by operating the LIDAR sensor(s) in ambient light collection mode) or whether the acquired images are generated by a camera system deployed within LIDAR system 100 or on the host vehicle.

Figure 11A:
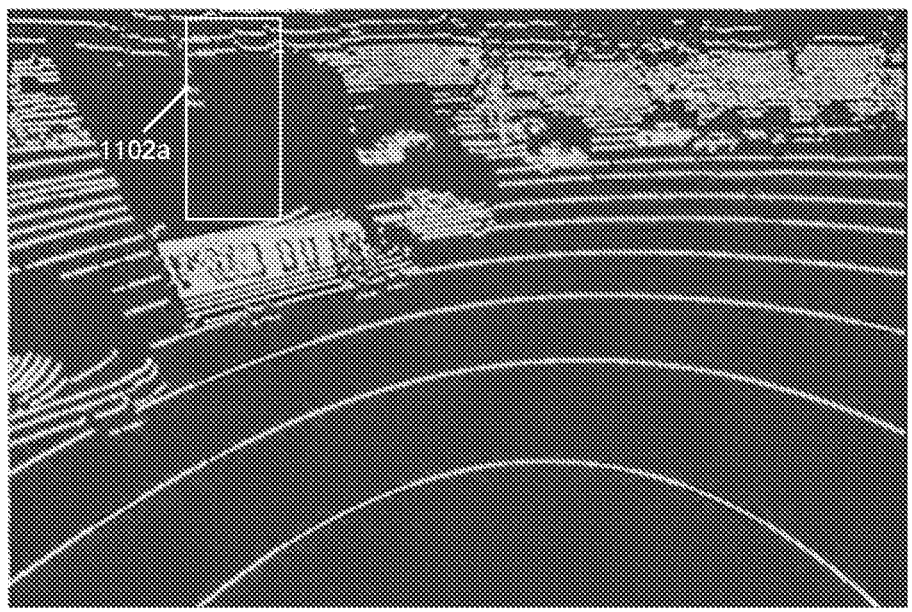
FIGS. 11A and 11B are images showing representations of a point cloud and a camera image, respectively, generated from output of a LIDAR system consistent with disclosed embodiments.
Figure 11B:

FIGS. 11A and 11B illustrate exemplary point cloud and image representations for a particular scene in an environment of LIDAR system 100. Specifically, FIG. 11A represents a generated point cloud of a field of view associated with the LIDAR system, and FIG. 11B represents and ambient light-based image acquired relative to a similar field view. Based on a comparison of the generated point cloud (FIG. 11A) with the acquired image (FIG. 11B), processing unit 108 may determine whether inconsistencies exist between the point cloud and the image. Inconsistencies may include differences in size, shape, reflectivity, or other object or environmental characteristics represented by the generated point cloud and the acquired image. Detection of one or more such inconsistencies may constitute a triggering event that causes processing unit 108 to initiate retrieval from the point cloud archive of at least a portion of the point clouds stored in the archive.

Other types of triggering events may also lead to retrieval of one or more generated point clouds from the point cloud archive. For example, a point-cloud archive output triggering event may include an operator override of one or more autonomous driving system (ADS) or advanced driver assist system (ADAS) features. For example, whether a vehicle is fully autonomous or partially autonomous, a human operator may take control of the vehicle in certain situations or in response to certain conditions. While not necessarily the case, such an override event may indicate a system malfunction or at least a response by a navigational system of the vehicle that is different from a response expected by the human operator. In such cases, retrieval of point clouds generated prior to the override event may assist in later reconstruction of the conditions that led to the operator override. In other cases, a point-cloud archive output triggering event may include the detected occurrence of an accident involving the host vehicle on which the LIDAR system is deployed. In such cases, retrieval of point clouds generated prior to the detected accident may assist in later reconstruction of the conditions that led to the accident. More generally, the point-cloud archive output triggering event may include a request received from one or more processors associated with the host vehicle or associated with a server system remotely located relative to the vehicle.

Further, the point-cloud archive output triggering event may include a determination that an incorrect classification of a detected object has occurred. For example, the processing unit 108 may be configured to identify an object or determine an object class for a detected object represented in one or more generated point clouds. Such identification or classification may be performed by an object identification model (e.g., trained neural network) configured to analyze generated point clouds an output a result including one or more object identifiers associated with particular detected objects represented in a point cloud. In some cases, however, an initial identification or classification of a detected object may be changed or updated based on analysis of later-generated point clouds. For example, in cases where a target object is approaching the LIDAR system, it may be difficult to accurately identify the target object or to properly classify the target object when the target object is far from the LIDAR system and occupies only a small region of the LIDAR field of view. As the target object approaches the LIDAR system, however, it may occupy a larger region of the LIDAR system field of view and/or may return stronger laser light reflections signals. Thus, based on later generated point clouds, identification and/or classification of a detected object may be more accurate, and a previously identified/classified tracked target object may be re-identified/classified based on at least one later-generated point cloud. A change made to an identification or classification of a detected object based on analysis of a later-generated point cloud may constitute a point cloud archive triggering event. In response to such a triggering event, the processing unit 108 may retrieve from the point cloud archive at least the point clouds generated from the time of the first detection of a particular object through the time that the point cloud resulting in the identification/classification change was generated.

Any number of point clouds may be retrieved from the point cloud archive in response to detection of a triggering event. At step 710, in response to detection of a point-cloud archive output triggering event, the processing unit 108 collects from the cache memory two or more point-cloud representations from the point-cloud archive that were generated within a predetermined period of time relative to the detected point-cloud archive output triggering event. For example, after detecting an incorrect classification of an object, an inconsistency between outputs of two or more sensors associated with the vehicle, an operator override of one or more autonomous driving system (ADS) or advanced driver assist system (ADAS) feature associated with the vehicle, occurrence of an accident involving the vehicle, or a request received from one or more processors associated with the vehicle or a server system remotely located relative to the vehicle, etc., processing unit 108 retrieves at least two point clouds from the cache. In another example, after detecting a change in classification, size, shape and/or any other physical property of an object, one or more point clouds may be retrieved from the cache.

At step 712, the processing unit 108 outputs the two or more point clouds collected from the memory. As discussed above, LIDAR system 100 may include network interface 214 for communicating with host 210 (e.g., a vehicle controller). In addition to outputting of the retrieved point clouds to the host vehicle, the retrieved point clouds may also be transferred to a location remotely located relative to the LIDAR system and/or the host vehicle. In one embodiment, network interface 214 may include an integrated service digital network (ISDN) card, cable modem, satellite modem, or wireless transmitter to provide a data communication connection to a corresponding type of communication line or system. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as point clouds. Using such communication pathways, processing unit 108 may be configured to output two or more point clouds collected from the cache memory to one or more processing devices associated with the vehicle. For example, processing unit 108 may transmit point clouds to a vehicle controller/ECM etc. associated with host 210. In some embodiments, processing unit 108 may be configured to output the two or more point clouds collected from the cache memory to a non-volatile memory device onboard the vehicle. For example, processing unit 108 may transmit point clouds to a black box type of recording system located on the vehicle using network interface 214. In some embodiments, processing unit 108 may be configured to output the two or more point clouds collected from the cache memory to a non-volatile memory device associated with the LIDAR system. For example, processing unit 108 may transmit the retrieved point clouds to a black box, disk drive, etc. associated with LIDAR system 100. Further, in some embodiments, the processing unit may be configured to output the two or more point clouds collected from the cache memory to a server remotely located relative to the vehicle. For example, processing unit 108 may transmit point clouds collected from the cache memory to a control center, central server, communications center, accident reconstruction facility, etc. using network interface 214. Point clouds retrieved from a point cloud archive need not be limited to those generated prior to a triggering event. In some embodiments, processing unit 108 is configured to output one or more post-event point clouds generated after detection of the point-cloud archive output triggering event. Such post-event point clouds may also be useful in determining the conditions associated with a particular triggering event. For example, LIDAR system 100 may continue to scan the LIDAR system field of view and to generate corresponding point clouds even after detection of a triggering event. In some cases, once a triggering event is detected, all further generated point clouds may be stored in the archive and/or transferred to a non-volatile memory (e.g., associated with the LIDAR system, host vehicle, remote server, etc.). In other cases, storage of newly generated point clouds subsequent to detection of a triggering event may adhere to the rolling predetermined time window scheme described above, except that point clouds generated within a certain period of time prior to the detected triggering event and point clouds generated within a certain time period after the triggering event may be transferred from the archive to a non-volatile memory (e.g., associated with the LIDAR system, host vehicle, remote server, etc.). For example, the predetermined time window after a detected triggering event for which generated point clouds are retrieved from the archive may include a total time until the LIDAR system is powered off or may include a certain number of seconds or minutes (e.g., 0.5 seconds, 1 second, 2, seconds, 5 seconds, 10 seconds, 30 seconds, one minute, etc.).

Figure 8:
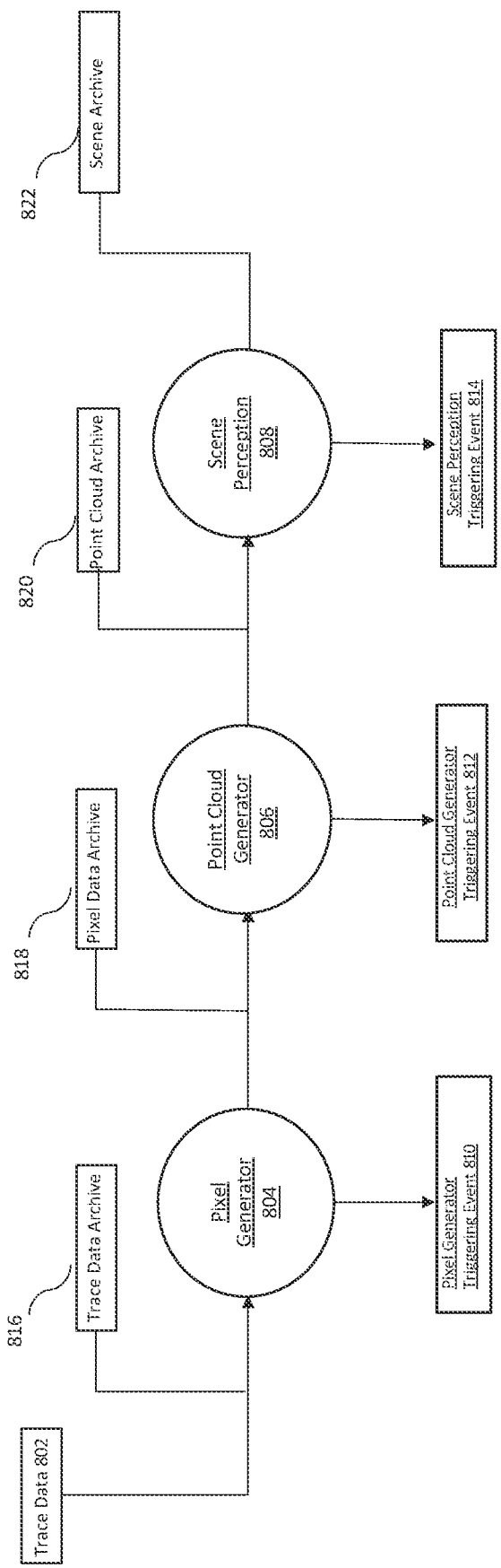
FIG. 8 is a diagram of a processing flow for archiving and retrieving data from cache in multiple stages of processing in a LIDAR system.

In some embodiments, data associated with multiple operational stages of the LIDAR system may be separately cached for later retrieval in response to detected triggering events. Determination of which data to retrieve from among the available cached data for the multiple operational stages may depend on the type of a particular detected triggering event. FIG. 8 depicts an example process flow diagram representative of several stages of data generation and data archiving consistent with operation of the disclosed LIDAR systems. In the example embodiment of FIG. 8, a multi-stage LIDAR data system 800 may include a pixel generator 804, a point cloud generator 806, and a scene perception unit 808.

In the example embodiment, at least one processor may be configured to implement a LIDAR data system in three discrete stages. Data associated with each of the stages may be stored in corresponding buffers. The first stage of the multi-stage LIDAR data system 900 may include a pixel generator 804 that creates pixel data from trace data received from the at least one sensor. The pixel generator 804 may be configured to receive data from the sensing unit 106 representative of laser light reflections from objects in the field of view 120 of the LIDAR system 100. The received data may be digitized and input to the pixel generator 804 as trace data 802. The received trace data 802 may represent measurements from each field of view pixel and may enable determination of the time of flight between a light pulse emission event and a corresponding reflection reception event. The trace data may also enable determination of the intensity of the received photons for each field of view pixel. The reception event may be the result of the light pulse being reflected from an object. The time of flight may be included as a timestamp value in the trace data 802 that represents a range to the reflecting object. The trace data 802 (e.g., a digitized data stream received from the sensing unit 106) may be processed in the pixel generator 804 to produce pixel data. The information associated with each pixel represents the basic data element from which a point cloud representative of the captured field of view in three-dimensional space may be built. It is to be appreciated that the trace data 802 and extracted pixel data may be associated with one or more points in the field of view 120 of the LIDAR system. Additionally, information relating to frame boundaries from the scan of the field of view 120 may be maintained with the trace data 802 and the pixel data extracted by the pixel generator 804. The pixel generator 804 may pass pixel data to the point cloud generator 806 for further processing. The pixel generator 804 may also have memory allocated to store input and output data consistent with embodiments described herein. For example, the pixel generator 804 may be associated with a trace data archive 816 configured to store at least some of the trace data 802 input to the pixel generator. Additionally, at least some of the pixel data generated by the pixel generator 804 may be stored in a pixel data archive 818.

Data system 800 may also include a second stage, wherein the second stage includes a point cloud generator 806 configured to generate point cloud representations from pixel data provided by the pixel generator. The pixel is the basic element of a point cloud representation and may represent a spatial position and time of flight/range value. The point cloud generator 806 may pass point cloud representation data to the scene perception unit 808 for further processing. Additionally, at least some of the point cloud representations output by the point cloud generator 806 may be stored in a point cloud archive 820.

As shown in the example embodiment of FIG. 8, a third stage of the multi-stage LIDAR data system 800 may include a scene perception unit 808 configured to identify and classify objects based on one or more point cloud representations received from the point cloud generator 806. For example, the scene perception unit 808 may use the one or more point cloud representations input from the point cloud generator 806 to identify an object or determine an object class for a detected object. Such identification or classification may be performed by an object identification model (e.g., a trained network) associated with the scene perception unit 908 configured to analyze generated point clouds and output a result including one or more object identifiers associated with detected objects represented in a point cloud. The resulting scene information may be supplied by the LIDAR system to a vehicle navigation system or any type of host system with which the LIDAR system is associated. In turn, the vehicle navigation system may generate navigation information (e.g., navigational actions, etc.) based on point cloud information generated by the LIDAR system relative to objects in the environment of the host vehicle The navigational information may include one or more identifiers and one or more range values associated with objects detected in the field of view 120. In some embodiments, the navigation information may include one or more point cloud representations. At least some of the scene data generated by the scene perception unit 808 may be stored in a scene data archive 822. Additionally, at least some of the point cloud information provided by point cloud generator 806 and provided as input to scene perception unit 808 may also be stored in scene archive 822.

The multi-stage LIDAR data system 800 may be implemented by a LIDAR processor architecture 600 or other similar processing unit described in embodiments in the present disclosure. One or more processors may store at least some of the generated data for one or more stages of the processing flow and/or may store other associated information in cache memory to provide an archive for any or all of the data stages of the LIDAR system. The described cache memory units (e.g., archives 816, 818, 820, 822, etc.) may include a volatile memory unit, which maintains stored data as long as power is supplied to the memory unit. In some cases, such archives may also be implemented using non-volatile memory.

Cache memory archives in the multi-stage LIDAR data system 800 may enable efficient, local storage of various types of LIDAR system data that may be accessed quickly in response to a detected triggering event. The cache memory/data archives may be maintained for temporary storage of a rolling window of LIDAR system information. For example, the cache memory may maintain archived data within a certain predetermined time window. Once the archive associated with that time window is filled, older data in the archive may be overwritten by newer information. In some embodiments, the multi-stage LIDAR data system 800 may include a non-volatile memory unit included in the LIDAR system or in an associated host allowing older data or critical data to be moved to bulk storage that may retain the data after power is removed. The one or more processors may perform memory management functions such as generating and managing one or more databases and buffering data within the one or more databases for the archives (e.g. trace data archive 816, pixel data archive 818, point cloud archive 820 and scene archive 820) to save data during normal operation and retrieve data from relevant buffers upon detection of a triggering event.

Memory management may be implemented based on amount of cache memory available and based on discriminatory archiving. Such management may assist in reducing memory usage and in eliminating data and scenarios not relevant to what may be needed from historical LIDAR data for training, debugging and improving detection of the LIDAR system. Each data stage included in the LIDAR system may be associated with a single, dedicated cache memory or may be associated with multiple, dedicated cache memories to provide archives associated with the respective stages.

FIGS. 9A and 9B illustrate examples of memory structures that may be employed in conjunction with the disclosed archives. FIG. 9A shows an exemplary logical structure that may be used to provide pixel data archive 940, Here, pixel data records 944 may be stored in pixel cache memory 942. FIG. 9B shows an example logical structure of a point cloud archive 960 with point cloud representations 964 stored in point cloud cache memory 962. Both examples represent records that are stored on a first in, first out basis after obtaining an initial group of data corresponding to a rolling time window.

Separating the data processing and data archiving tasks of a LIDAR system into multiple different stages may be associated with several potential benefits. For example, caching just the input or output to the LIDAR processing system may result in limited information being available in the event of a cache memory retrieval trigger event. Separately archiving data associated with multiple data processing stages in the LIDAR system can provide more granular information in the event of a retrieval trigger event. This may be especially beneficial where certain archived data is more relevant to certain types of triggering events than to other types of triggering events. By way of an example, in the case of an accident involving the host vehicle, the cached data from one or more data stages associated with the LIDAR data processing system may contain information allowing for a forensic review of the circumstances associated with the accident. In one case, an inspection of trace data archive 816 records may reveal whether data output from one or more LIDAR sensors included the effects of blooming, defective sensor pixels, etc. In another case, data stored in scene archive 822 may be analyzed to determine whether an object represented in point cloud archive 820 was correctly detected, identified, and/or tracked. It may be advantageous to retrieve, analyze, and/or compare data from multiple different archives to isolate issues or the source of detected inaccuracies during debugging or to recreate scenarios indicative of the operation of the LIDAR system.

During normal operation of the processing flow, data may be captured and stored in the archives as the LIDAR system acquires data. Detection of various types of cache retrieval triggering events will result in data retrieval from one or more archives. The archives selected for data retrieval may depend on the type of triggering event detected. When a triggering event is detected, the one or more processors implementing the processing flow may collect from one or more cache memory archives data generated within a pre-determined period of time relative to the triggering event. In the multi-stage LIDAR data system 800, each stage may have different output rules and different output properties based on triggering events. The retrieved archive data may be output from the LIDAR system to one or more processors onboard a host vehicle, may be output to a non-volatile memory (e.g., black box), or may be transmitted to a remote location, etc. In the example embodiment of FIG. 8, each stage of the processing flow of the multi-stage LIDAR data system 900 may be associated with one or more triggering events. That is, certain types of triggering events will result in data retrieval from trace data archive 816, and other types of triggering events will result in data retrieval from pixel data archive 818, point cloud archive 820, or scene archive 822. Certain types of triggering events may result in data retrieval from a single archive. Other types of triggering events, however, will result in data retrieval from multiple archives.

Each stage of the data processing system 800 may be associated with various different types of triggering events. For example, in response to detection of a certain type of triggering event categorized as a pixel generator trigger event 810, trace data from trace data archive 816 may be retrieved. Additionally or alternatively, pixel data may be retrieved from pixel data archive 818. Similarly, in response to detection of a point cloud generator triggering event 812, data may be retrieved from pixel data archive 818 and/or point cloud archive 820. Further, in response to detection of a scene perception triggering event 814, data may be retrieved from point cloud archive 820 and/or scene archive 822. For any of the archive types, the data collected includes data that were generated a pre-determined period of time relative to the detected triggering event.

The one or more archive records collected from cache memory may be output to the host system, a remote server or external memory associated with the LIDAR system or host system. Returning to the example shown in FIG. 9A, a pixel generator triggering event 810 may occur near in time to pixel data record N being received. Based on the triggering event, archived records associated with pixel generator 804 may be retrieved. In this example, pixel data record K and K+1 may be retrieved. The type of triggering may also dictate what the LIDAR system does with the retrieved pixel data records (e.g., sends them to the host, stores them in non-volatile memory etc.).

Various types of triggering events may result in retrieval of stored data from one or more archives. In a particular example, an internal pixel generator triggering event 810 may be detected by one or more processors (e.g., processor(s) that implement the pixel generator 804) during an evaluation of trace data 802 and/or pixel data provided to point cloud generator 806. A pixel generator triggering event 810 may include but is not limited to a change in the state of an element of the sensing unit 106 such as a failed component in the sensing unit 106, at least one pixel error detected by the one or more processors in the pixel generator 804, a functional safety event such as a detector or any other monitoring system component being downgraded, a sensor detected weather condition such as rain, snow, ambient temperature etc., an ambient light condition that may affect the quality of the trace data 802, or a request from the host system to collect one or more trace data archives 816. An external pixel generator triggering event 810 may be received from the host system via the network interface between the host system and the LIDAR system. The one or more processors may be configured to output one or more records from the trace data archive 816 and/or pixel data archives 818 generated after detection of a pixel generator triggering event 810. Further, one or more archives may be included within a predetermined time window after detection of the pixel generator triggering event 810. The one or more archive records created by the pixel generator 804 may be comprised of trace data 802, pixel data 818, or a combination of both data types. The pixel generator 804 may process the data into a different data type consistent with the output rules and the properties of the output data may be dependent on the pixel generator 804 and/or the specifics of the triggering event. By way of an example, the time window of the retrieved archive records and the type of data in the archive may determine at the time of the triggering event based on the nature of the data that needs to be captured. It is to be appreciated in presently disclosed embodiments that historically acquired LIDAR trace data 802 and pixel data information as it may be acquired at the output of the sensing unit 106 and the output of the pixel generator 804 may be of value to assist in recreating environmental and system conditions before, during or after certain triggering events.

Other types of triggering events may also result in data retrieval from one or more archives. For example, a point cloud generator triggering event may be detected and in response, at least one of point cloud representation from the point cloud archive 820 generated during a pre-determined period of time relative to the detected point cloud generator triggering event 812 may be retrieved. The one or more records from the point cloud archive 820 collected from cache memory may be output to the host system, a remote server, or external memory associated with the LIDAR system or host system. Returning to FIG. 9B, a point cloud generator triggering event 812 may occur near in time to receipt of point cloud data record N. Based on the triggering event, the point cloud generator 806 may retrieve archived records. In the example, the point cloud generator 806 may retrieve point cloud data record L. The type of point cloud generator triggering event 812 may determine what the LIDAR system does with the retrieved point cloud data record (i.e. sends them to the host, stores them in non-volatile memory etc.). In some embodiments, in response to a triggering event, the point cloud generator 806 may retrieve all records in the point cloud archive.

A point cloud generator triggering event 812 may be detected based on evaluation of the pixel data or the point cloud data to be stored in pixel data archive 818 or point cloud archive 820. A point cloud generator triggering event 812 (e.g., an internal point cloud triggering event) may include conflicting information between frames, a change in classification of a tracked object, a change in traffic conditions, detected weather events, a change to the velocity or direction of the vehicle, objects disappearing from tracking, a size change of an object in the field of view of the LIDAR system, an identification of an object type from geolocation or perception such as a bridge or tunnel and the like. For example, in some cases, detection of certain object types (e.g, bridges, tunnels, bicycles, motorcycles, etc.) may trigger storage of point cloud information associated with the detected object. Such stored point cloud information may be used, for example, as validation data for later identifying various object types objects. The stored point cloud information (together with associated object type information) may also be used in generation of training datasets for training machine learning systems (e.g., trained neural networks, etc.). Other types of point cloud triggering events 812 (e.g., an external point cloud triggering event) may include a host system recognized change in a LIDAR system state, a sensor mismatch such as a conflict in data perceived between a camera sensor and LIDAR system, an accident or near accident, an airbag deployment, a geolocation or navigation system recognition of a feature of interest, an external emergency signal broadcasted to record in a specific geolocation, emergency braking detection, an operator override, weather events and the like. An external point cloud generator triggering event 812 may be received from the host system via the network interface between the host system and the LIDAR system. Each trigger event type may be associated with a particular set of data retrieval actions to take.

Certain types of triggering events may result in data retrieval from archives associated with the scene perception data stage 808. For example, in response to detection of a scene perception triggering event 814, scene data may be collected from the scene data archive 822. The record(s) retrieved from the scene archive 822 may be output to the host system, a remote server or external memory associated with the LIDAR system or host system.

An scene generator triggering event 814 may be detected during an evaluation of the point cloud representation data or the scene data by the one or more processors that implement scene perception unit 808. A scene generator triggering event 814 (e.g., an internal scene generator triggering event) may include conflicting information between scenes, a change in identification or classification of a tracked object, a non-physical detection such as an object growing in size or becoming distorted, disappearing or appearing objects, an identification of an object type from geolocation or perception of a feature of interest and the like. Other types of scene perception triggering events 814 (e.g., an external scene perception triggering event) may include a host system recognized change in the LIDAR state or malfunction, an external emergency signal broadcast, a sensor mismatch such as a conflict in data perceived between a camera sensor and LIDAR sensor, an accident or near accident, time of day, the identification of objects of interest, weather events and the like. An external scene perception triggering event 812 may be received from the host system via the communication interface between the host system and the LIDAR system. It is to be appreciated that each trigger may be associated with what action to take by the scene generator unit 808 in terms of the data to collect over an associated period of time.

It is to be appreciated that triggering events related to evaluations of the data in different stages may indicate a degradation in the expected performance of the LIDAR system and as such may warrant data collection for future recreation and analysis purposes. Since different trigger conditions may relate to different scenarios, each trigger may be associated with what data to capture and what processing steps are required as a result of the trigger.

In the example embodiment, collected data from archives may be provided by the multi-stage LIDAR data system 800 to one or more systems of the host vehicle, such as the host vehicle navigation system. In some embodiments, the one or more processors of the multi-stage LIDAR data system 800 may be configured to output one or more collected records from archives to one or more processors associated with the host vehicle or to non-volatile memory on board the host vehicle. In some embodiments, the one or more processors of the multi-stage LIDAR data system 800 may be configured to output collected data from archives in cache memory to a non-volatile memory associated with multi-stage LIDAR data system 800. In some embodiments, the one or more processors of the multi-stage LIDAR data system 800 may be configured to output one or more collected archives from the cache memory to a server remotely located relative to the host vehicle. In embodiments, the network interface between the host vehicle and multi-stage LIDAR data system 800 may be used, for example, to receive instructions from the external system such as external triggering events, to receive information regarding the inspected environment, to receive information from another sensor, to transmit collected archive records to one or more processors or storage devices associated with the host system or multi-stage LIDAR data system 800. It is to be appreciated that the example embodiment describing the multiple stages of processing and in other embodiments described herein, the features of the disclosed embodiments include the ability to detect a certain type of event of interest (e.g., a triggering event), collect archive data from different stages of processing of the LIDAR data present in the LIDAR system to potentially reconstruct the conditions experienced by the LIDAR system relative to the event and communicating the collected archives to the host system via a network interface.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A LIDAR system, comprising:
   at least one light source configured to project laser light toward a field of view of the LIDAR system;
   at least one sensor configured to detect laser light reflections from objects in the field of view of the LIDAR system; and
   at least one processor configured to:
   use the laser light reflections to generate point-cloud representations of an environment of the LIDAR system within the field of view of the LIDAR system,
   output navigational information based on the generated point-cloud representations to one or more processors associated with a vehicle on which the LIDAR system is mounted,
   store at least some of the generated point-cloud representations in a memory to provide a point-cloud archive,
   detect occurrence of a point-cloud archive output triggering event,
   in response to detection of the point-cloud archive output triggering event, collect from the memory two or more point-clouds from the point-cloud archive that were generated within a predetermined period of time relative to the detected point-cloud archive output triggering event, and
   output the two or more point-clouds collected from the memory.

2. The LIDAR system of claim 1, wherein the memory comprises at least one volatile memory unit.

3. The LIDAR system of claim 1, wherein the at least one processor is further configured to output one or more post-event point-clouds generated after detection of the point-cloud archive output triggering event.

4. The LIDAR system of claim 3, wherein the one or more post-event point-clouds are included within a predetermined time window after detection of the point-cloud archive output triggering event.

5. The LIDAR system of claim 1, wherein the predetermined period of time includes a rolling time window.

6. The LIDAR system of claim 5, wherein the generated point-cloud representations are stored on a first in, first out basis after obtaining an initial group of point-cloud representations corresponding to the rolling time window.

7. The LIDAR system of claim 1, wherein the predetermined period of time includes a total time from a last power-on event associated with the LIDAR system.

8. The LIDAR system of claim 1, wherein the navigational information includes one or more identifiers and one or more range values associated with one or more objects detected in the environment of the LIDAR system.

9. The LIDAR system of claim 8, wherein the one or more identifiers include an object type classifier associated with the one or more objects detected in the environment of the LIDAR system.

10. The LIDAR system of claim 1, wherein the navigational information includes a point-cloud representation.

11. The LIDAR system of claim 1, wherein the generated point-cloud representations each include a plurality of points spatially distributed relative to the field of view, and wherein each of the plurality of points is associated with a calculated range value.

12. The LIDAR system of claim 1, wherein the predetermined period of time is determined based on a type classifier associated with the detected point-cloud archive output triggering event.

13. The LIDAR system of claim 1, wherein the point-cloud archive output triggering event includes an inconsistency between outputs of two or more sensors associated with the vehicle.

14. The LIDAR system of claim 13, wherein the two or more sensors include at least a camera and the LIDAR system.

15. The LIDAR system of claim 1, wherein the point-cloud archive output triggering event includes an operator override of one or more autonomous driving system (ADS) or advanced driver assist system (ADAS) feature associated with the vehicle.

16. The LIDAR system of claim 1, wherein the point-cloud archive output triggering event includes occurrence of an accident involving the vehicle.

17. The LIDAR system of claim 1, wherein the point-cloud archive output triggering event includes a request received from the one or more processors associated with the vehicle or a server system remotely located relative to the vehicle.

18. The LIDAR system of claim 1, wherein the point-cloud archive output triggering event includes a determination that an incorrect classification of a detected object has occurred.

19. The LIDAR system of claim 1, wherein the at least one processor is configured to output the two or more point-clouds collected from the memory to one or more processing devices associated with the vehicle.

20. The LIDAR system of claim 1, wherein the at least one processor is configured to output the two or more point-clouds collected from the memory to a non-volatile memory device onboard the vehicle.

21. The LIDAR system of claim 1, wherein the at least one processor is configured to output the two or more point-clouds collected from the memory to a non-volatile memory device associated with the LIDAR system.

22. The LIDAR system of claim 1, wherein the at least one processor is configured to output the two or more point-clouds collected from the memory to a server remotely located relative to the vehicle.

23. The LIDAR system of claim 1, wherein the at least one processor is further configured to implement a multi-stage LIDAR data system including two or more stages.

24. The LIDAR system of claim 23, wherein a first stage of the multi-stage LIDAR data system includes a pixel generator that creates pixel data from trace data received from the at least one sensor.

25. The LIDAR system of claim 24, wherein the pixel generator stores at least some of the trace data in a trace data archive in the memory.

26. The LIDAR system of claim 24, wherein the pixel generator stores at least some of the pixel data in a pixel data archive in the memory.

27. The LIDAR system of claim 24, wherein the at least one processor is configured to retrieve and output, in response to detection of a pixel output triggering event, at least one of trace data from a trace data archive or pixel data from a pixel data archive that were generated within a pre-determined period of time relative to the detected pixel output triggering event.

28. The LIDAR system of claim 24, wherein a second stage of the multi-stage LIDAR data system includes a point-cloud generator that generates the point-cloud representations from pixels extracted by the pixel generator.

29. The LIDAR system of claim 28, wherein the point-cloud generator is configured to store one or more of the point-cloud representations in a point-cloud archive in the memory.

30. The LIDAR system of claim 28, wherein the at least one processor is configured to retrieve and output, in response to detection of a point-cloud generator triggering event, at least one of point-cloud representation from a point-cloud archive that were generated within a pre-determined period of time relative to the detected point-cloud generator triggering event.

31. The LIDAR system of claim 28, wherein a third stage of the multi-stage LIDAR data system includes a scene perception unit configured to identify and classify objects based on the point-cloud representations received from the point-cloud generator.

32. The LIDAR system of claim 31, wherein the scene perception unit is configured to store at least some scene data in a scene data archive in the memory.

33. The LIDAR system of claim 32, wherein the at least one processor is configured to retrieve and output, in response to detection of a scene perception triggering event, scene data from the scene data archive that were generated within a pre-determined period of time relative to the detected scene perception triggering event.

34. The LIDAR system of claim 1, wherein the memory is a cache memory.

\* \* \* \* \*